United States Patent
Jung et al.

(10) Patent No.: US 12,462,771 B2
(45) Date of Patent: Nov. 4, 2025

(54) BENDABLE DISPLAY DEVICE HAVING AMBIENT LIGHTS AND METHOD FOR CONTROLLING THE SAME

(71) Applicant: LG ELECTRONICS INC., Seoul (KR)

(72) Inventors: Sungon Jung, Seoul (KR); Sunwoo Jung, Seoul (KR); Myongyoung Lee, Seoul (KR); Kyuyong Chung, Seoul (KR); Wonki Lee, Seoul (KR); Jongmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/718,217

(22) PCT Filed: Dec. 15, 2021

(86) PCT No.: PCT/KR2021/019073
§ 371 (c)(1),
(2) Date: Jun. 10, 2024

(87) PCT Pub. No.: WO2023/113068
PCT Pub. Date: Jun. 22, 2023

(65) Prior Publication Data
US 2025/0069567 A1    Feb. 27, 2025

(51) Int. Cl.
*G09G 5/02* (2006.01)
*G06F 1/16* (2006.01)
(Continued)

(52) U.S. Cl.
CPC ............ *G09G 5/02* (2013.01); *G06F 1/1652* (2013.01); *G09G 3/035* (2020.08); *G09G 3/32* (2013.01); *G09G 2320/0666* (2013.01)

(58) Field of Classification Search
CPC ............ G09G 5/02; G09G 3/035; G09G 3/32; G09G 2320/0666; G06F 1/1652;
(Continued)

(56) References Cited

U.S. PATENT DOCUMENTS

| | | | | |
|---|---|---|---|---|
| 2005/0117190 A1* | 6/2005 | Iwauchi | ................ | H05B 45/20 |
| | | | | 359/237 |
| 2007/0091111 A1* | 4/2007 | Gutta | ...................... | H04N 5/58 |
| | | | | 345/591 |

(Continued)

FOREIGN PATENT DOCUMENTS

| KR | 10-2012-0128092 | 11/2012 |
|---|---|---|
| KR | 10-2015-0062098 | 6/2015 |

(Continued)

OTHER PUBLICATIONS

PCT International Application No. PCT/KR2021/019073, Written Opinion and International Search Report dated Sep. 8, 2022, 11 pages.

*Primary Examiner* — Richard J Hong
(74) *Attorney, Agent, or Firm* — LEE, HONG, DEGERMAN, KANG & WAIMEY

(57) ABSTRACT

In one embodiment of the present invention, a display device is provided, the display device comprising: a body including a display module that outputs images; one or more lights positioned behind the body; and a control unit, wherein the control unit determines whether the display module is in operation and identifies the shape of the display module.

10 Claims, 17 Drawing Sheets

(51) Int. Cl.
  *G09G 3/00* (2006.01)
  *G09G 3/32* (2016.01)
(58) Field of Classification Search
  CPC . G06F 3/167; G06F 1/1601; H04N 21/41265;
      H04N 5/58; H05B 47/155; H05B 45/20;
      H05K 5/0217; H05K 5/02; G09F 9/00;
      G09F 19/02
  See application file for complete search history.

(56) References Cited

U.S. PATENT DOCUMENTS

| | | | | |
|---|---|---|---|---|
| 2012/0224347 | A1* | 9/2012 | Hayakawa | G06F 1/1601 |
| | | | | 361/807 |
| 2013/0166042 | A1* | 6/2013 | Sharma | H05B 47/155 |
| | | | | 700/28 |
| 2014/0198465 | A1* | 7/2014 | Park | G09F 9/00 |
| | | | | 361/749 |
| 2014/0226266 | A1* | 8/2014 | Kang | H05K 5/02 |
| | | | | 361/679.01 |
| 2015/0009635 | A1* | 1/2015 | Kang | G09F 19/02 |
| | | | | 361/749 |
| 2015/0145837 | A1* | 5/2015 | Park | H04N 21/41265 |
| | | | | 345/184 |
| 2018/0061438 | A1* | 3/2018 | Love | G06F 3/167 |
| 2018/0295317 | A1* | 10/2018 | Tyagi | H05B 47/155 |
| 2023/0186809 | A1* | 6/2023 | Lee | H05K 5/0217 |
| | | | | 345/156 |

FOREIGN PATENT DOCUMENTS

| | | |
|---|---|---|
| KR | 10-2016-0141009 | 12/2016 |
| KR | 10-2021-0056094 | 5/2021 |
| KR | 10-2021-0061857 | 5/2021 |

\* cited by examiner (a)

| tone \ hue | | R | YR | Y | GY | G | BG | B | PB | P | RP | | Neutral |
|---|---|---|---|---|---|---|---|---|---|---|---|---|---|
| vivid | V | 231,47,39 | 238,113,25 | 255,200,8 | 170,198,27 | 19,166,50 | 4,148,87 | 1,134,141 | 3,86,155 | 46,20,141 | 204,63,92 | N9.5 | 244,244,244 |
| strong | S | 207,46,49 | 226,132,45 | 227,189,28 | 162,179,36 | 18,154,47 | 6,134,84 | 3,130,122 | 6,113,148 | 92,104,163 | 175,92,87 | N9 | 236,236,236 |
| bright | B | 231,108,86 | 241,176,102 | 255,228,15 | 169,19,35 | 88,171,45 | 43,151,89 | 0,147,159 | 59,130,157 | 178,137,166 | 209,100,109 | N8 | 206,206,206 |
| pale | P | 233,163,144 | 242,178,103 | 255,236,79 | 219,220,93 | 155,196,113 | 146,198,131 | 126,188,209 | 147,184,213 | 197,188,211 | 218,176,176 | N7 | 180,180,180 |
| very pale | Vp | 236,217,202 | 245,223,181 | 249,239,189 | 228,235,191 | 221,232,207 | 209,234,211 | 194,222,242 | 203,215,232 | 224,218,230 | 235,219,224 | N6 | 152,152,152 |
| light grayish | Lgr | 213,182,166 | 218,196,148 | 233,227,143 | 209,116,73 | 179,202,157 | 166,201,163 | 127,175,166 | 165,184,199 | 184,190,189 | 206,185,179 | N5 | 126,126,126 |
| light | L | 211,142,110 | 215,145,96 | 255,203,88 | 195,202,101 | 141,188,90 | 140,195,110 | 117,173,169 | 138,166,187 | 170,165,199 | 205,154,149 | N4 | 86,86,86 |
| grayish | Gr | 171,131,115 | 158,128,110 | 148,133,105 | 144,135,96 | 143,162,121 | 122,165,123 | 130,154,145 | 133,154,153 | 151,150,139 | 160,147,131 | N3 | 60,60,60 |
| dull | Dl | 162,88,61 | 167,100,67 | 139,117,65 | 109,116,73 | 88,126,61 | 39,122,62 | 24,89,63 | 53,109,98 | 44,77,143 | 115,71,79 | N2 | 38,38,38 |
| deep | Dp | 172,36,45 | 167,87,49 | 156,137,37 | 91,132,47 | 20,114,48 | 23,106,43 | 20,58,60 | 8,87,107 | 58,55,119 | 111,61,56 | N1.5 | 10,10,10 |
| dark | Dk | 116,47,50 | 115,63,44 | 103,91,44 | 54,88,48 | 30,98,50 | 27,86,49 | 15,53,65 | 16,76,84 | 40,57,103 | 88,60,50 | | |
| dark grayish | Dgr | 79,46,43 | 85,55,43 | 75,63,45 | 44,60,49 | 34,62,51 | 31,56,45 | 29,60,47 | 25,62,63 | 34,54,68 | 53,52,48 | | |

Color Image Scale with RGB values

R/Lgr 213,162,166 hue/tone (color sample) R,G,B

Clear, Fresh

Dynamic, Gorgeous

BENDABLE DISPLAY DEVICE HAVING AMBIENT LIGHTS AND METHOD FOR CONTROLLING THE SAME

CROSS-REFERENCE TO RELATED APPLICATION(S)

This application is the National Stage filing under 35 U.S.C. 371 of International Application No. PCT/KR2021/019073, filed on Dec. 15, 2021, the contents of which is hereby incorporated by reference herein in its entirety.

TECHNICAL FIELD

The present disclosure relates to a display device with a variable curved structure that may improve user's immersion.

BACKGROUND

With the increasing development of information society, the demand for display devices is also increasing in various forms. In response to this trend, various display devices, for example, Liquid Crystal Display (LCD), Field Emission Display (FED), Plasma Display Panel (PDP), an electroluminescent device, etc. have recently been developed.

A liquid crystal panel of the LCD may include a liquid crystal layer, may further include a thin film transistor (TFT) substrate and a color filter substrate that are arranged to face each other on the basis of the liquid crystal panel interposed therebetween, and may display an image using light provided from a backlight unit.

As an example of an electroluminescent device, active-matrix-type organic light emitting display (OLED) devices are commercially available on the market and widely used throughout the world. Since the OLED device is a self-emitting device, the OLED device has no backlight and is advantageous in terms of a response speed and a viewing angle as compared to the LCD, so that the OLED devices are attracting attention as next-generation displays.

As described above, since the OLED device has no backlight, the OLED device can be bent and deformed in shape, resulting in implementation of a curved display module. However, the curved display module may increase immersion, but when multiple people are watching, it may be more convenient in terms of image watching for the display module to be unfolded to be flat.

SUMMARY

Technical Problem

The present disclosure is to provide a display device that may change a curvature to solve the above problem.

Technical Solutions

According to an aspect of the present disclosure, provided is a display device including a main body including a display module where an image is output, one or more lights located on a rear surface of the main body, and a controller, wherein the controller determines whether the display module is operating, and determines a shape of the display module.

In one implementation, when determining that the display module is operating, the controller may change a color rendered in the one or more lights based on a change in a curvature of the display module.

In one implementation, the controller may control the one or more lights to render a first color when the display module is in a bending mode, control the one or more lights to render a second color when the display module is in a flat mode, and control the one or more lights to render a third color in a flashing manner when the display module is operating from the bending mode to the flat mode or when the display module is operating from the flat mode to the bending mode.

In one implementation, the controller may analyze a mode of the image output by the display module when the shape of the display module is the flat mode, extract a color temperature setting value of the analyzed mode, and change a color rendered in the one or more lights based on the extracted color temperature.

In one implementation, the color rendered in the one or more lights may be an optimal LED white value based on the extracted color temperature.

In one implementation, the controller may extract an emotional keyword from the image output by the display module when the shape of the display module is a bending mode, and change a color rendered in the one or more lights based on the extracted emotional keyword.

In one implementation, the display device may further include a database for a color patch, and the controller may change the color rendered in the one or more lights based on the color patch.

In one implementation, the display device may further include a database for a color spectrum, and the controller may change the color rendered in the one or more lights based on the color spectrum.

In one implementation, the one or more lights may include six LED bars, and the six LED bars may be located symmetrically to each other about a vertical axis.

In one implementation, the display device may further include a back cover for covering the main body and the controller, and the one or more lights may be located on the back cover.

In one implementation, the display device may further include a bending module located at a center of the rear surface of the main body, a pair of links, wherein each link has one end coupled to the bending module and extends in a left and right direction, and link brackets located at left and right ends of the main body, respectively, wherein the other end of each link is connected to each link bracket, the bending module may include a guide shaft extending from the rear surface of the main body, and a moving block inserted into the guide shaft and movable in a forward and rearward direction, and when the moving block moves in the forward and rearward direction along the guide shaft, an angle between the pair of links may change and a curvature of the display module may change.

According to another aspect of the present disclosure, provided is a method for controlling a display device including outputting an image via a display module of the display device, determining whether the display module is operating, determining a shape of the display module, and changing a color rendered in one or more lights attached to a rear surface of a main body of the display device based on at least one of whether the display module is operating or the shape of the display module.

Advantageous Effects

The display device of the present disclosure may transform the display module into the flat mode or the bending mode, so that the display module may be used by the user in the desired form.

The display device of the present disclosure may maximize the visual effect that may be felt in the image using the ambient light.

Effects that may be obtained from the present disclosure are not limited to the effects mentioned above, and other effects not mentioned are able to be clearly understood by those skilled in the art in the technical field to which the present disclosure belongs from a description below.

BRIEF DESCRIPTION OF THE DRAWINGS

FIG. 15 is a diagram showing a color patch referenced to output colors via one or more lights in a display device according to an embodiment of the present disclosure.

BEST MODE

Figure 1:
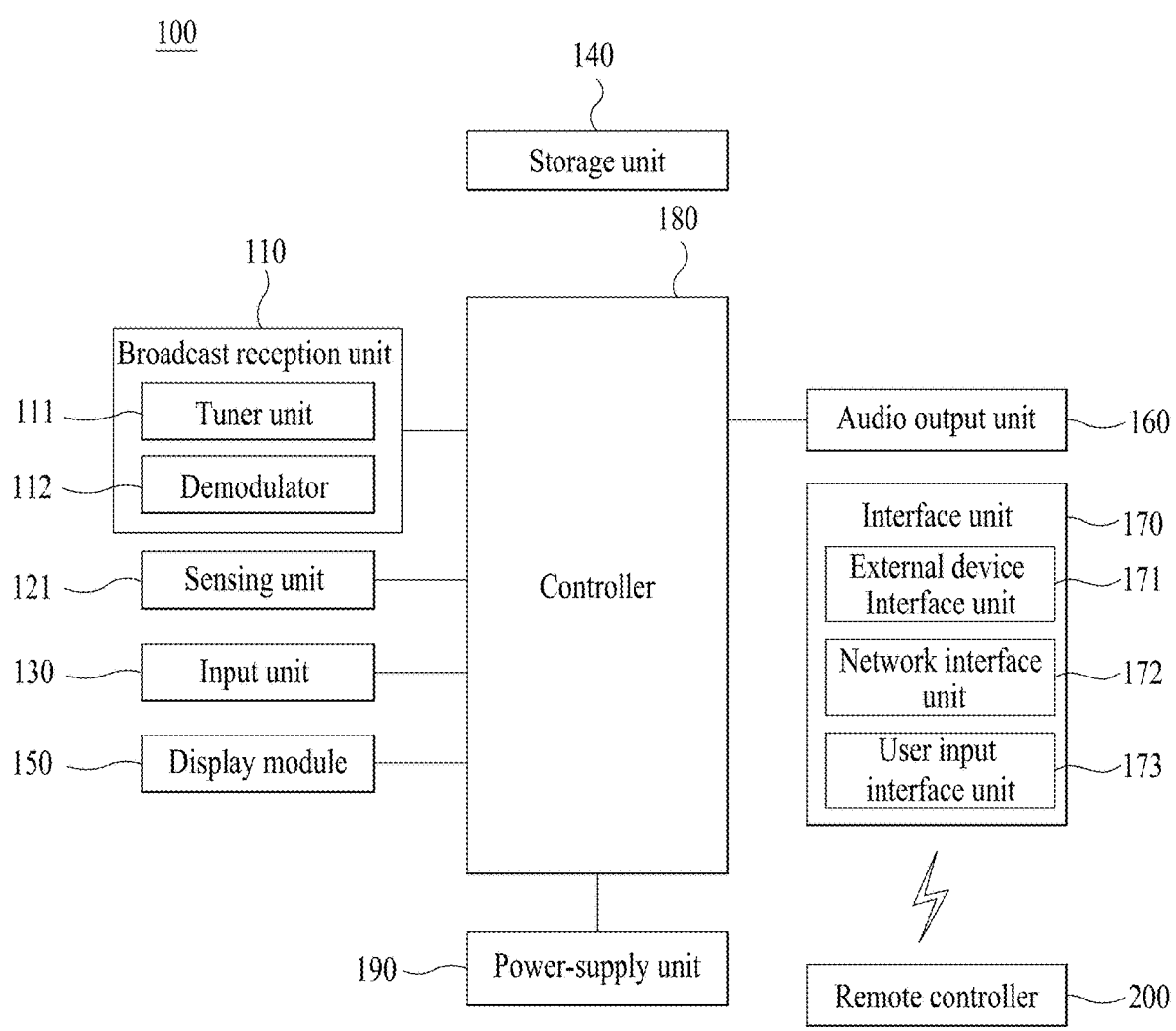
FIG. 1 is a block diagram illustrating constituent elements of a display device according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

On the other hand, the image display device described herein is, for example, an intelligent image display device implemented by adding a computer support function to a broadcast reception function, and further includes an Internet function or the like while sufficiently performing the broadcast reception function, so that the image display device may have user-friendly interfaces such as a handwriting input device, a touchscreen, or a spatial remote controller. Further, the image display device can support a wired or wireless Internet function by connecting to the Internet and a computer device, thereby performing e-mailing, web browsing, banking, or gaming. To implement these functions, the image display device may operate based on a standard general-purpose Operating System (OS).

Accordingly, the image display device according to the present disclosure is designed in a manner that various applications can be easily added to or deleted from a general-purpose OS kernel so that the image display device can perform various user-friendly functions. The image display device may be, for example, a network TV, a Hybrid broadcast broadband TV (HBBTV), a smart TV, etc. The image display device is applicable to a smartphone as needed.

FIG. 1 is a block diagram illustrating constituent elements of a display device 100 according to an embodiment of the present disclosure.

Referring to FIG. 1, the display device 100 may include a broadcast reception unit 110, an external device interface unit 171, a network interface unit 172, a storage unit 140, a user input interface unit 173, an input unit 130, a controller 180, a display 150, an audio output unit 160, and/or a power-supply unit 190.

The broadcast reception unit 110 may include a tuner unit 111 and a demodulator 112.

Although not shown in the drawings, the display device 100 may include only the external device interface unit 171 and the network interface unit 172 from among the broadcast reception unit 110, the external device interface unit 171, and the network interface unit 172. That is, the display device 100 may not include the broadcast reception unit 110.

The tuner unit 111 may select a broadcast signal corresponding to either a user-selected channel or all prestored channels from among broadcast signals received through an antenna (not shown) or a cable (not shown). The tuner unit 111 may convert the selected broadcast signal into an intermediate frequency (IF) signal or a baseband image or a voice signal.

For example, when the selected broadcast signal is a digital broadcast signal, the tuner unit 111 may convert the selected broadcast signal into a digital IF (DIF) signal. When the selected broadcast signal is an analog broadcast signal, the tuner unit 111 may convert the selected broadcast signal into an analog baseband image or a voice signal (CVBS/SIF). That is, the tuner unit 111 may process the digital broadcast signal or the analog broadcast signal. The analog baseband image or the voice signal (CVBS/SIF) output from the tuner unit 111 may be directly input to the controller 180.

The tuner unit 111 may sequentially select broadcasting signals of all broadcasting channels stored through a channel memory function from among the received broadcast signals, and may convert the selected broadcast signal into an intermediate frequency (IF) signal or a baseband image or a voice signal.

The tuner unit 111 may include a plurality of tuners to receive broadcast signals of the plurality of channels. Alternatively, a single tuner for simultaneously receiving broadcast signals of the plurality of channels is also possible.

The demodulator 112 may receive the digital IF signal (DIF) converted by the tuner unit 111, and may thus perform demodulation of the received signal. The demodulator 112 may perform demodulation and channel decoding, and may output a stream signal (TS). The stream signal may be a signal formed by multiplexing an image signal, a voice signal, or a data signal.

The stream signal (TS) output from the demodulator 112 may be input to the controller 180. The controller 180 may perform demultiplexing, image/audio signal processing, etc., may output an image through the display 150, and may output a voice through the audio output unit 160.

The sensing unit 120 may sense a change in the display device 100 or may sense an external change. For example, the sensing unit 120 may include a proximity sensor, an illumination sensor, a touch sensor, an infrared (IR) sensor, an ultrasonic sensor, an optical sensor (e.g., a camera), a voice sensor (e.g., a microphone), a battery gauge, environmental sensors (e.g., hygrometer, a thermometer, etc.).

The controller 180 may check a state of the display device 100 based on information collected by the sensing unit 120, may notify the user of a problem, or may control the display device 100 to be kept in the best state.

In addition, it is possible to provide an optimal viewing environment by differently controlling the content, image quality, size, etc. of the image provided to the display module 180 depending on the viewer, ambient illuminance, etc. sensed by the sensing unit. As the smart TV has evolved, the number of functions mounted in the display device increases, and the number of the sensing units 20 also increases together with the increasing functions.

The input unit 130 may be provided at one side of a main body of the display device 100. For example, the input unit 130 may include a touch pad, a physical button, and the like. The input unit 130 may receive various user commands related to the operation of the display device 100, and may transmit a control signal corresponding to the input command to the controller 180.

Recently, as a bezel of the display device 100 decreases in size, the number of display devices 100 each including a minimum number of input unit 130 formed in a physical button exposed to the outside is rapidly increasing. Instead, a minimum number of physical buttons may be provided on the back or side surface of the display device 100. The display device may receive a user input through the remote controller 200 through a touchpad or a user input interface unit 173 to be described later.

The storage unit 140 may store a program for processing and controlling each signal used in the controller 180, and may store a signal-processed image, a voice, or a data signal. For example, the storage unit 140 may store application programs designed for the purpose of performing various tasks that can be processed by the controller 180, and may selectively provide some of the stored application programs upon request of the controller 180.

The program stored in the storage unit 140 is not specifically limited to being executed by the controller 180. The storage unit 140 may perform a function for temporarily storing an image, a voice, or a data signal received from an external device through the external device interface unit 171. The storage unit 140 may store information about a predetermined broadcast channel through a channel memory function such as a channel map.

Although the storage unit 140 of FIG. 1 is provided separately from the controller 180, the scope of the present disclosure is not limited thereto, and the storage unit 140 may also be included in the controller 180 as needed.

The storage unit 140 may include at least one of a volatile memory (e.g., DRAM, SRAM, SDRAM, etc.) and a non-volatile memory (e.g., flash memory, hard disk drive (HDD), solid state drive (SSD), etc.).

The display 150 may generate a drive signal by converting an image signal, a data signal, an OSD signal, a control signal processed by the controller 180, or by converting an image signal, a data signal, a control signal, etc. received from the interface unit 171. The display 150 may include a display panel 181 having a plurality of pixels.

A plurality of pixels included in the display panel may include RGB sub-pixels. Alternatively, a plurality of pixels included in the display panel may include sub-pixels of RGBW. The display 150 may convert the image signal, the data signal, the OSD signal, the control signal, etc. processed by the controller 180 to generate a drive signal for the plurality of pixels.

The display 150 may be implemented as a plasma display panel (PDP), a liquid crystal display (LCD), an organic light emitting diode (OLED), a flexible display, etc. In addition, the display 150 may also be implemented as a three-dimensional (3D) display. The three-dimensional (3D) display 150 may be classified into a glassless-type 3D display and a glasses-type 3D display.

The display device may include a display module that occupies most parts of the front surface, and a case that covers the back and side surfaces of the display module and packages the display module.

Recently, the display device 100 has evolved from a flat-screen display to a curved-screen display. In order to implement the curved screen, the display device 100 may use a display module 150 that can be bent or curved, such as a light emitting diode (LED) or an organic light emitting diode (OLED), etc.

Conventionally, the LCD has difficulty in self-emitting light, so that the conventional LCD has been designed to receive light through a backlight unit. The backlight unit is a device for uniformly supplying light received from a light source to a liquid crystal located on the front surface of the display device. As the backlight becomes thinner, a thin LCD can be implemented. However, it is actually difficult for the backlight unit to be implemented as a curved structure formed of a flexible material. Although the backlight unit is implemented as a curved shape, it is difficult for light to be uniformly applied to the liquid crystal, thereby changing brightness of the screen.

On the other hand, the LED or the OLED is designed in a manner that each of constituent elements constructing the pixels can self-emit light without using the backlight unit, so that the LED or the OLED can be implemented as a curved shape without any problems. In addition, since each element can perform self-emission of light, brightness of each element is not affected by a change in the positional relationship between the element and adjacent elements, so that a curved display module 150 can be implemented as an LED or OLED.

OLED (Organic Light Emitting Diode) panels appeared in earnest in mid-2010 and are rapidly replacing LCDs in the small- and medium-sized display market. The OLED is a display made using the self-emission characteristics in which OLED emits light when a current flows in a fluorescent organic compound. Since the response speed of the OLED is faster than that of the LCD, there is little afterimage when moving images are implemented.

OLEDs may be used as a light-emitting display product. In this case, the light-emitting display device may use three fluorescent organic compounds (such as red, green, and blue) each having a self-emitting function, and may use the self-emitting phenomenon in which positive(+)-charged particles and electrons injected from a cathode and anode are combined with each other within the organic material, so that a backlight unit causing degradation of color sense need not be used.

The LED panel is implemented by technology for using only one LED element as one pixel, and has a smaller LED element compared to the prior art, so that a curved display module 150 can be implemented. Whereas the conventional device referred to as an LED TV can use the LED as a light source of the backlight unit for supplying light to the LCD, it is impossible for the LED of the conventional device to constitute a screen.

The display module may include a display panel, a coupling magnet located on the rear surface of the display panel, a first power-supply unit, and a first signal module. The display panel may include a plurality of pixels (R, G, B). The plurality of pixels (R, G, B) may be formed in each region where a plurality of data lines and a plurality of gate lines cross each other. The plurality of pixels (R, G, B) may be arranged in a matrix.

For example, the plurality of pixels (R, G, B) may include a red (R) sub-pixel, a green (G) sub-pixel, and a blue (B) sub-pixel. The plurality of pixels (R, G, B) may further include white (W) sub-pixel(s).

In the display module 150, one side where an image is displayed may be referred to as a front side or a front surface. When the display module 150 displays an image, one side where no image is observed may be referred to as a rear side or a rear surface.

Meanwhile, the display 150 may be implemented as a touchscreen, so that the display 150 can also be used as an input device in addition to an output device.

The audio output unit 160 may receive a voice-processed signal from the controller 180, and may output the received signal as a voice signal.

The interface unit 170 may serve as a path of connection to various kinds of external devices connected to the display device 100. The interface unit may include not only a wired method for transmitting/receiving data through a cable, but also a wireless method using the antenna.

The interface unit 170 may include at least one of a wired/wireless headset port, an external charger port, a wired/wireless data port, a memory card port, a port connected to a device having an identification module, an audio input/output (I/O) port, a video I/O port, and an earphone port.

As an example of a wireless method, the above-described broadcast reception unit 110 may be used. The broadcast reception unit 110 may be configured to use a broadcast signal, a mobile communication short-range communication signal, a wireless Internet signal, and the like.

The external device interface unit 171 may transmit or receive data to and from a connected external device. To this end, the external device interface unit 171 may include an A/V input/output (I/O) unit (not shown).

The external device interface unit 171 may be wired or wirelessly connected to an external device such as a digital versatile disc (DVD) player, a Blu-ray player, a game console, a camera, a camcorder, a computer (laptop), a set-top box, or the like, and may perform an input/output (I/O) operation with the external device.

In addition, the external device interface unit 171 may establish a communication network with various remote controllers 200, may receive a control signal related to operation of the display device 100 from the remote controller 200, or may transmit data related to operation of the display device 100 to the remote controller 200.

The external device interface unit 171 may include a wireless communication unit (not shown) for short-range wireless communication with other electronic devices. Through the wireless communication unit (not shown), the external device interface unit 171 may exchange data with an adjacent mobile terminal. In particular, the external device interface unit 171 may receive device information, application information, an application image, and the like from the mobile terminal in a mirroring mode.

The network interface unit 172 may provide an interface for connecting the display device 100 to a wired/wireless network including the Internet network. For example, the network interface unit 172 may receive content or data provided by the Internet, a content provider, or a network administrator through a network. The network interface unit 172 may include a communication module (not shown) for connection with the wired/wireless network.

The external device interface unit 171 and/or the network interface unit 172 may include a communication module for short-range communication such as Wi-Fi, Bluetooth, Bluetooth low energy (BLE), ZigBee, Near Field Communication (NFC), and a communication module for cellular communication such as Long-Term Evolution (LTE), LTE-A (LTE Advanced), Code Division Multiple Access (CDMA), WCDMA (wideband CDMA), UMTS (universal mobile telecommunications system), WiBro (Wireless Broadband), etc.

The user input interface unit 173 may transmit user input signals to the controller 180, or may transmit signals received from the controller 180 to the user. For example, the user input interface unit 173 may transmit or receive user input signals (such as a power-on/off signal, a channel selection signal, and a screen setting signal) to and from the remote controller 200, may transmit user input signals received through a local key (not shown) such as a power key, a channel key, a volume key, and a setting key to the controller 180, may transmit a user input signal received by a sensor unit (not shown) for sensing a user gesture to the controller 180, or may transmit a signal received from the controller 180 to the sensor unit.

The controller 180 may include at least one processor, and may control the overall operation of the display device 100 using the processor included therein. Here, the processor may be a general processor such as a CPU. Of course, the processor may be a dedicated device such as an ASIC, or other hardware-based processor.

The controller 180 may demultiplex the stream received through the tuner unit 111, the demodulator 112, the external device interface unit 171, or the network interface 172, and may process the demultiplexed signals to generate and output a signal for image or voice output.

The image signal processed by the controller 180 may be input to the display 150 and displayed as an image corresponding to the corresponding image signal. In addition, the image signal processed by the controller 180 may be input to the external output device through the external device interface unit 171.

The voice (or audio) signal processed by the controller 180 may be audibly output to the audio output unit 160. In addition, the voice signal processed by the controller 180 may be input to the external output device through the external device interface unit 171. Although not shown in FIG. 2, the controller 180 may include a demultiplexer, an image processor, and the like, and a detailed description thereof will hereinafter be described with reference to FIG. 3.

In addition, the controller 180 may control the overall operation of the display device 100. For example, the controller 180 may control the tuner unit 111 to select a broadcast program corresponding to either a user-selected channel or a prestored channel.

In addition, the controller 180 may control the display device 100 by a user command or an internal program received through the user input interface unit 173. The controller 180 may control the display 150 to display an image. In this case, the image displayed on the display 150 may be a still image or a moving image, and may be a 2D image or a 3D image.

On the other hand, the controller 180 may display a predetermined 2D object in the image displayed on the display 150. For example, the object may be at least one of a connected web screen (newspaper, magazine, etc.), electronic program guide (EPG), various menus, widgets, icons, still images, moving images, and text.

Meanwhile, the controller 180 may modulate and/or demodulate the signal using an amplitude shift keying (ASK) scheme. Here, the ASK scheme may refer to a method for modulating a signal by differentiating the amplitude of a carrier wave according to data values or for restoring an analog signal to a digital data value according to the amplitude of the carrier wave.

For example, the controller 180 may modulate an image signal using the ASK scheme, and may transmit the modulated signal through a wireless communication module.

For example, the controller 180 may demodulate and process the image signal received through the wireless communication module using the ASK scheme.

Accordingly, the display device 100 may simply transmit and receive signals to and from other image display devices arranged adjacent to each other without using either a unique identifier such as a Media Access Control (MAC) address or a complex communication protocol such as TCP/IP.

On the other hand, the display device 100 may further include a photographing unit (not shown). The photographing unit may photograph a user. The photographing unit may be implemented as one camera, but is not limited thereto, and may be implemented by a plurality of cameras. On the other hand, the photographing unit may be embedded in the display device 100 or may be separately arranged on the display 150. The image information photographed by the photographing unit may be input to the controller 180.

The controller 180 may recognize the position of the user based on the image photographed by the photographing unit. For example, the controller 180 may recognize a distance (z-axis coordinates) between the user and the display device 100. In addition, the controller 180 may recognize the X-axis coordinate and the Y-axis coordinate within the display 150 corresponding to the user position.

The controller 180 may sense a user gesture based on an image photographed by the photographing unit, each of signals detected by the sensor unit, or a combination thereof.

The power-supply unit 190 may supply corresponding power to the display device 100. In particular, the controller 180 may be implemented as a System on Chip (SoC), a display 150 for displaying an image, and an audio output unit 160 for audio output.

Specifically, the power-supply unit 190 may include a converter (not shown) for converting AC power into DC power, and a DC/DC converter (not shown) for converting the level of DC power.

On the other hand, the power-supply unit 190 may receive power from the external power source, and may distribute the received power to the respective components. The power-supply unit 190 may be directly connected to the external power source to supply AC power, and may include a battery capable of being charged with electricity.

In the former case, the power-supply unit 190 may be used by connecting to a wired cable, and it is difficult for the power-supply unit 190 to move from one place to another place, and the movement range of the power-supply unit 190 is limited. In the latter case, the power-supply unit 190 can move from one place to another place, but the weight and volume of the power-supply unit 190 may increase as much as the weight and volume of the battery. In addition, for charging, the power-supply unit 190 should be directly connected to a power cable for a predetermined period of time or should be coupled to a charging cradle (not shown) for power supply.

The charging cradle may be connected to the display device through a terminal exposed to the outside. Alternatively, if the power-supply unit 190 approaches the charging cradle using a wireless interface, a built-in battery of the power-supply unit 190 may also be charged with electricity.

The remote controller 200 may transmit a user input to the user input interface unit 173. To this end, the remote controller 200 may use Bluetooth, Radio Frequency (RF) communication, infrared (IR) communication, Ultra-Wideband (UWB), ZigBee, or the like. In addition, the remote controller 200 may receive the image, voice, or data signal output from the user input interface unit 173, and may display or audibly output the received image, voice, or data signal.

On the other hand, the above-described display device 100 may be a fixed or mobile digital broadcast receiver capable of receiving digital broadcast signals.

Meanwhile, the block diagram of the display device 100 shown in FIG. 1 is disclosed for only for illustrative purposes for one embodiment of the present disclosure, and the respective components of the display device 100 shown in FIG. 1 can be integrated, added or omitted according to the specifications of the digital device 100 which is actually implemented.

That is, if necessary, two or more components may be combined into one component, or one component may be subdivided into two or more components. In addition, the functions performed in each block are intended to explain the embodiment of the present disclosure, and the specific operation or device does not limit the scope of the present disclosure.

Figure 2:
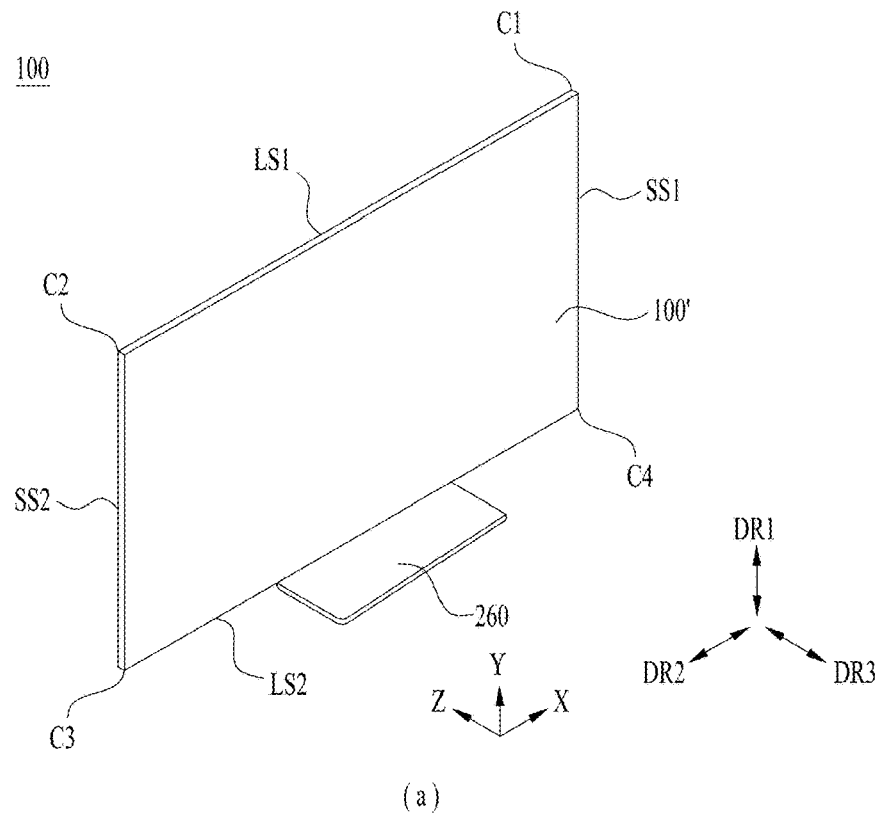
FIG. 2 is a perspective view illustrating an example of a display device according to an embodiment of the present disclosure.
Figure 2:
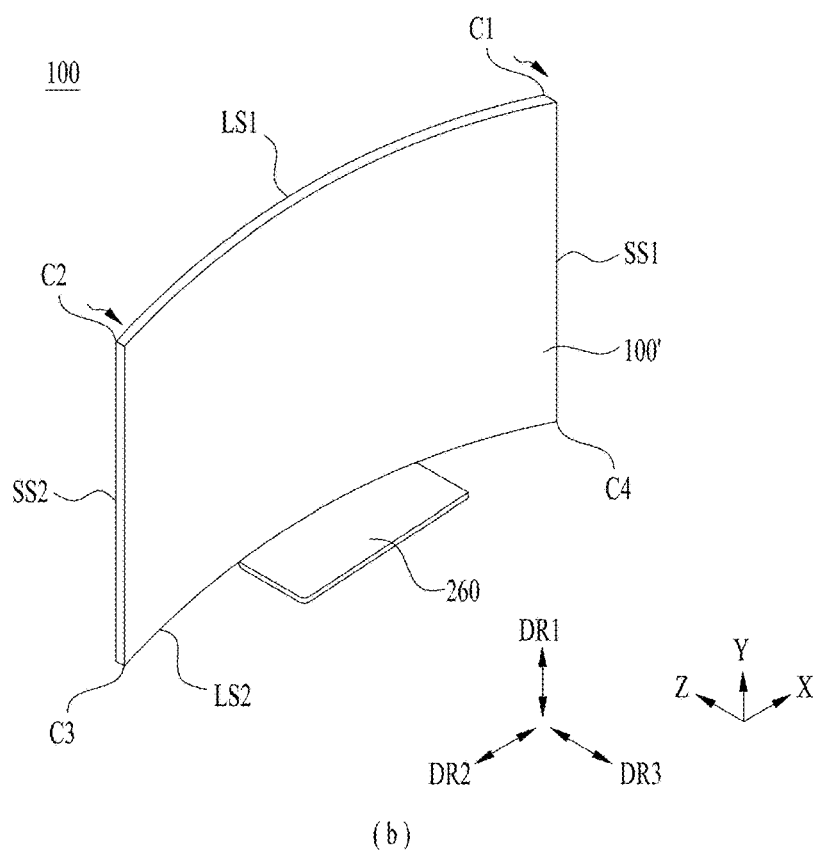

FIG. 2 is a perspective view illustrating an example of the display device according to an embodiment of the present disclosure.

Referring to FIG. 2, the display device 100 may have a rectangular body 100' including a first long side (LS1), a second long side (LS2) facing the first long side (LS1), a first short side (SS1) adjacent to the first long side (LS1) and the second long side (LS2), and a second short side (SS2) facing the first short side (SS1).

Here, the first short side area (SS1) is referred to as a first side area. The second short side area (SS2) is referred to as a second side area facing the first side area. The first long side area (LS1) is referred to as a third side area that is adjacent to the first side area and the second side area while being disposed between the first side area and the second side area. The second long side area (LS2) is referred to as a fourth side area that is adjacent to the first side area and the second side area while being disposed between the first side area and the second side area.

In addition, although the length of the first and second long sides LS1 and LS2 is longer than the length of the first and second short sides SS1 and SS2 as shown in FIG. 2, the scope of the present disclosure is not limited thereto, and the length of the first and second long sides LS1 and LS2 may also be approximately the same as the length of the first and second short sides SS1 and SS2 as needed.

In addition, the first direction (DR1) may be a direction parallel to each of the long sides LS1 and LS2 of the display device 100, and the second direction (DR2) may be a direction parallel to each of the short sides SS1 and SS2 of the display device 100. The third direction (DR3) may be a direction perpendicular to the first direction (DR1) and/or the second direction (DR2).

From another point of view, the side where the display device 100 displays an image may be referred to as a front side or a front surface. When the display device 100 displays an image, the side where no image is observed may be referred to as a back side or a back surface. When the display device 100 is viewed from the front side or the front surface, the first long side (LS1) may be referred to as an upper side or an upper surface. Similarly, the second long side (LS2) may be referred to as a lower side or a lower surface. Similarly, the first short side (SS1) may be referred to as a right side or a right surface, and the second short side (SS2) may be referred to as a left side or a left surface.

In addition, the first long side (LS1), the second long side (LS2), the first short side (SS1), and the second short side (SS2) may be referred to as an edge of the display device 100. A point where the first long side (LS1), the second long side (LS2), the first short side (SS1), and the second short side (SS2) meet each other may be referred to as a corner. For example, a point where the first long side (LS1) and the first short side (SS1) meet each other may be referred to as a first corner (C1). A point where the first long side (LS1) and the second short side (SS2) meet each other may be referred to as a second corner (C2). A point where the second short side (SS2) and the second long side (LS2) meet each other may be referred to as a third corner (C3). A point where the second long side (LS2) and the first short side (SS1) meet each other may be referred to as a fourth corner (C4).

Here, the direction from the first short side (SS1) to the second short side (SS2) or the direction from the second short side (SS2) to the first short side (SS1) may be referred to as a horizontal direction (LR). The direction from the first long side (LS1) to the second long side (LS2) or from the second long side (LS2) to the first long side (LS1) may be referred to as a vertical direction (UD).

The display device 100 according to the present disclosure may change the shape of the display module 150 using the LED or OLED instead of a liquid crystal, as shown in FIG. 2(*a*) or FIG. 2(*b*). That is, the backlight unit may be omitted, and the display device can be changed in shape within a predetermined range, so that the curved display device 100 can be implemented as shown in FIG. 2(*b*) using the above-described characteristics.

The display device 100 according to the present disclosure is a variable display device 100 in which a user can adjust a curvature according to a situation, rather than a curved display device fixed in a curved state. The display device 100 may further include a curvature adjustment unit capable of changing a curvature of the main body 100' configured to include the display module 150.

Figure 3:
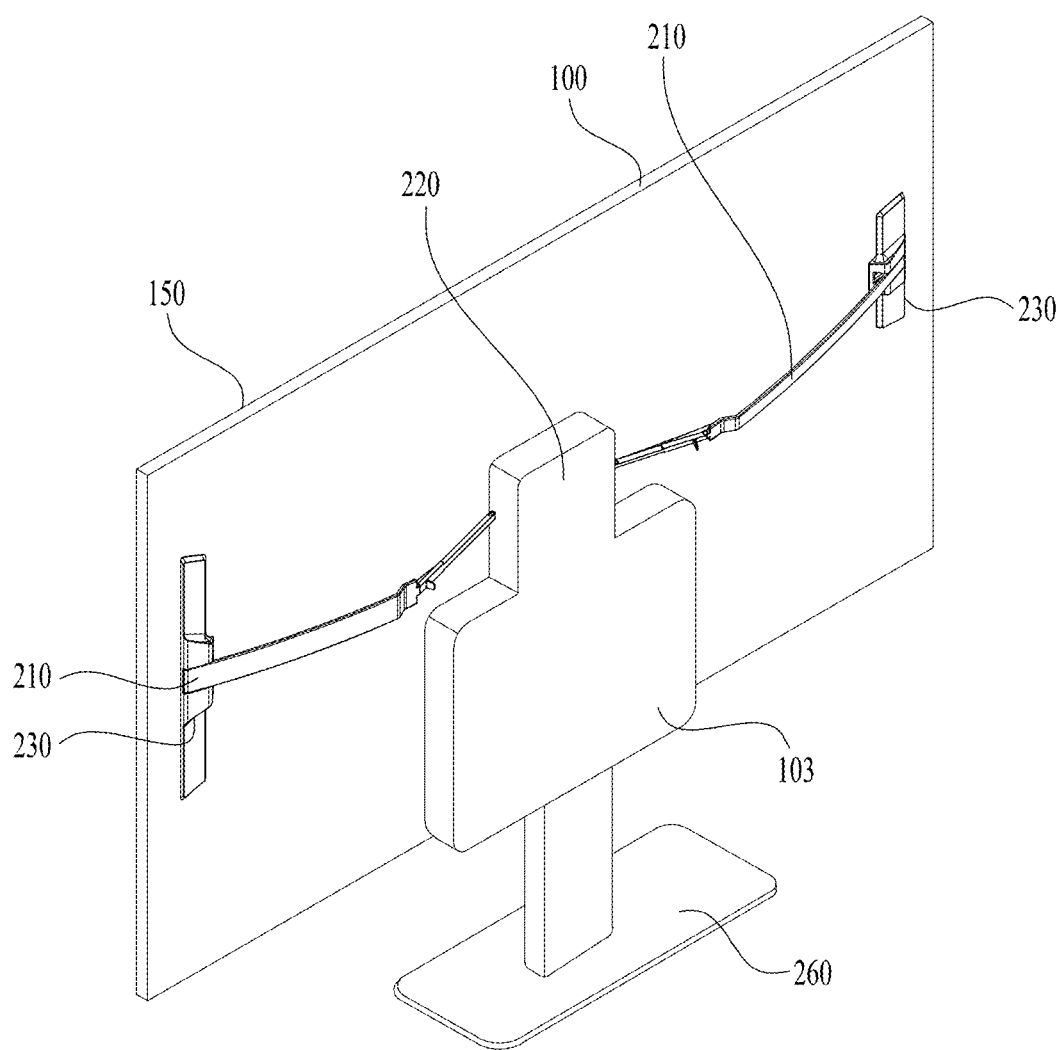
FIG. 3 is a rear view illustrating a display device according to an embodiment of the present disclosure.
Figure 4:
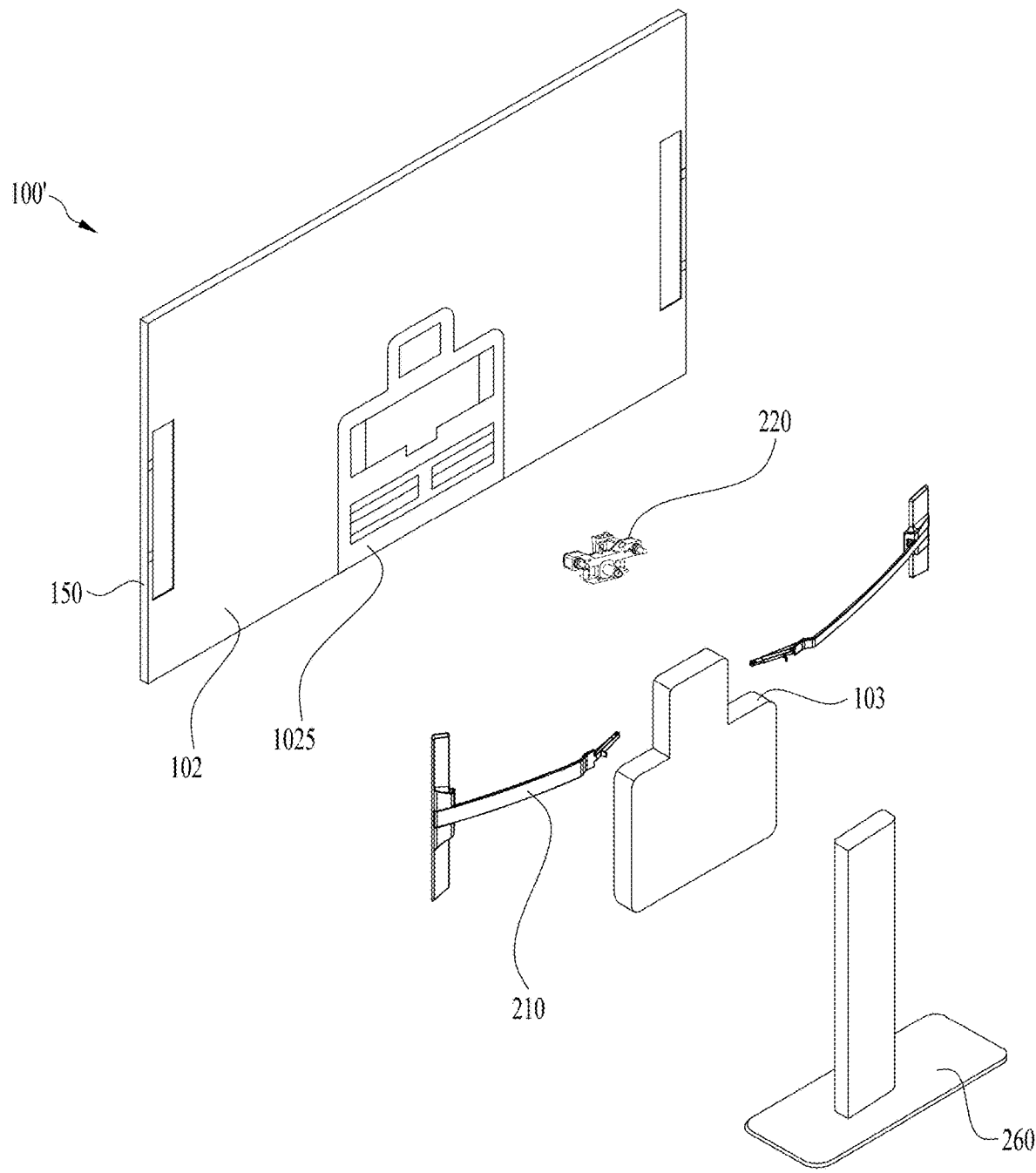
FIG. 4 is an exploded perspective view illustrating a display device according to an embodiment of the present disclosure.

FIG. 3 is a rear view illustrating the display device 100 according to an embodiment of the present disclosure. FIG. 4 is an exploded perspective view illustrating the display device 100 according to an embodiment of the present disclosure. Referring to FIGS. 3 and 4, the display device 100 may include a main body 100', a stand 260 for mounting the main body 100' on the floor, a controller 180, and curvature adjustment units 210, 220, and 230.

The main body 100' including the display module 150 may include a cover bottom 102 that covers a back surface of the display module 150 to which an image is output. A heat dissipation structure for discharging heat generated by the display module 150 may be provided at the inner surface of the cover bottom 102, and the main body 100' may further include a reinforcing material for reinforcing rigidity.

The cover bottom 102 may cover the back surface of the display module 150, may reinforce the rigidity of the display module 150, and may protect the back surface of the display module 150. In particular, the display module 150 may cover a driving IC of the display extending in a backward direction of the display module 150. A main substrate may be mounted on the back surface of the cover bottom 102 as a controller for controlling the display module 150, and a hole may be formed in the cover bottom 102 to interconnect the main substrate and the driving IC of the display module 150.

A separate bracket 1025 may be further provided so that the controller 180, such as a main board, can be mounted thereto. The display device 100 according to the present disclosure may further include a curvature adjustment unit for changing the curvature of the main body 100' other than the controller for controlling the display module 150 on the back surface of the cover bottom 102.

The curvature adjustment unit may further include a pair of links 210, a bending module 220 located at the center of the display device 100 and coupled to one end of the pair of links 210, and a pair of link brackets 230 disposed between the other end of the pair of links 210 and the cover bottom 102.

Figure 5:
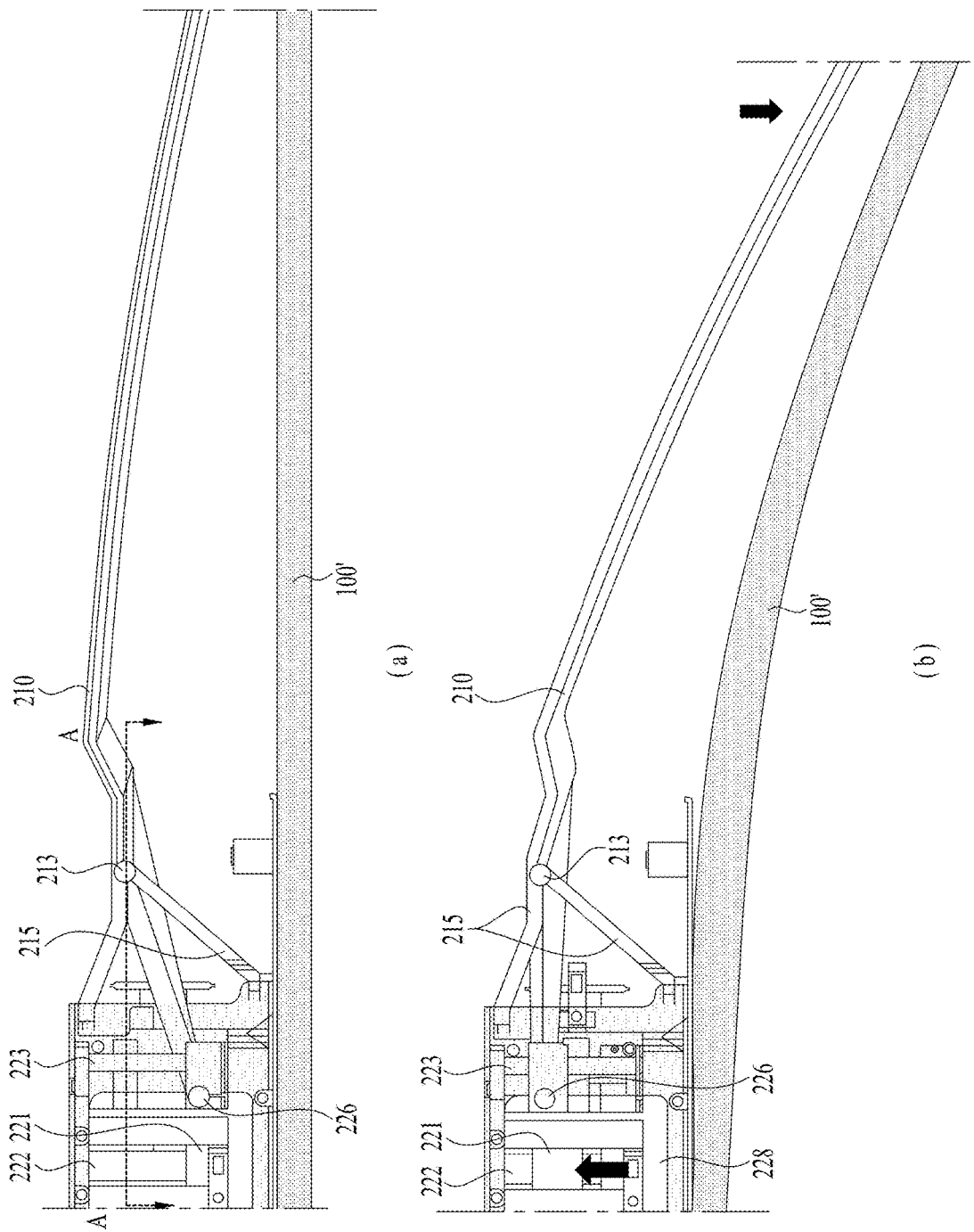
FIG. 5 is a top view illustrating a display device according to an embodiment of the present disclosure.

FIG. 5 is a top view illustrating the display device 100 according to an embodiment of the present disclosure. As shown in FIGS. 5(a) and 5(b), the curvature of the display device 100 may be changed according to the angle formed by the pair of links 210. The angle of the pair of links 210 may be adjusted according to a change in the position of the moving block 221 of the bending module 220.

The other end of the pair of links 210 may be slidably coupled to the link bracket 230. When the link bracket 230 is fixed to the link bracket 230, the curvature of the display module 150 is large at the end thereof so that it is difficult to implement a natural curved surface of the display module 150.

Accordingly, if the angle of the pair of links 210 is adjusted by the bending module 220, the other end of the link 210 slidably moves on the link bracket 230, so that a natural curved surface of the display module 150 can be implemented.

The bending module 220 may include a moving block 221 connected to one end of the link 210 and movable forward and backward, a guide shaft 222 for guiding the moving block 221 to move forward and backward without moving in the horizontal direction, and a module bracket 228 for receiving the bending module 220.

The link 210 is rotatably coupled to the link fixing unit 215 extending from the bending module 220. The link 210 may rotate around the link fixing pin 213 fastened to the link fixing unit 215, and one end and the other end of the link 210 may move in opposite directions.

When the user pulls the horizontal ends SS1 and SS2 of the main body 100' in a forward direction, the bending module 220 may allow the other end of the link 210 located on the horizontal ends SS1 and SS2 of the main body 100' to move in a forward direction, the link 210 may rotate around the link fixing pin 213, and one end of the link 210 may move in a backward direction.

In contrast, when the user pushes the horizontal ends SS1 and SS2 of the main body 100' in a backward direction so as to use the display device as a flat display, the other end of the link 210 may move backward and one end of the link 210 may move forward. A coupling position of the link fixing pin 213 may be located closer to one end of the link 210 than the other end of the link 210, and the movement distance of one end of the link 210 may be shorter than the movement distance of the other end of the link 210.

As described above, the user may manually change the curvature of the display device 100 by applying force to the horizontal ends SS1 and SS2 of the main body 100. At this time, the pair of links 210 is synchronized with the bending module 220 and simultaneously moved. As a result, the other side SS2 can also move at the same time when the user pulls or presses one side SS1 of the main body 100'.

However, according to the manual driving method, the user may apply force directly to the display module 150, there is a high risk of damage to the display module 150, and a motor is provided in the bending module 220, so that the curvature of the display module 150 can be changed.

For example, the guide shaft 222 may be formed in a spiral shape, and a spiral groove corresponding to the spiral of the guide shaft 222 may be formed in the moving block 221. When the motor rotates the guide shaft 222, the moving block 221 may move forward and backward.

When the moving block 221 of the bending module 220 moves backward, one end of the link 210 coupled to the moving block 221 moves backward, the other end of the link 210 moves forward, and the angle of the pair of links 210 may vary. The bending module 220 may induce a change in the angle of the links 210, and the display module 150 may again transition to the bent state or the flat state.

The display device 100 may further include a back cover 103 for covering the bending module 220 and the controller, and may further include a stand 260 for holding the main body 100' of the display device 100 on the floor. Instead of the stand 260, the display device 100 may further include a wall bracket that can be installed on the wall, and the stand 260 and the wall bracket may be coupled to the back cover 103.

In addition, the moving block 221 according to the present embodiment may move forward and backward along the guide shaft 222 protruding from the back surface of the main body 100'. One end of the link 210 may be coupled to the moving block 221, and may be rotatably coupled to the moving block 221 through the operation pin 226 to change the angle thereof according to movement of the moving block 221.

Hereinafter, specific embodiments of the display device described above will be described with reference to FIGS. 1 to 5. However, in FIGS. 1 to 5, the display device (hereinafter referred to as a bendable display device) capable of changing the curvature thereof has been mainly described for convenience of description, the scope or spirit of the present disclosure is not limited thereto, and the following description will be given centering upon an embodiment capable of being implemented in the display device including the bendable display device.

Figure 6:
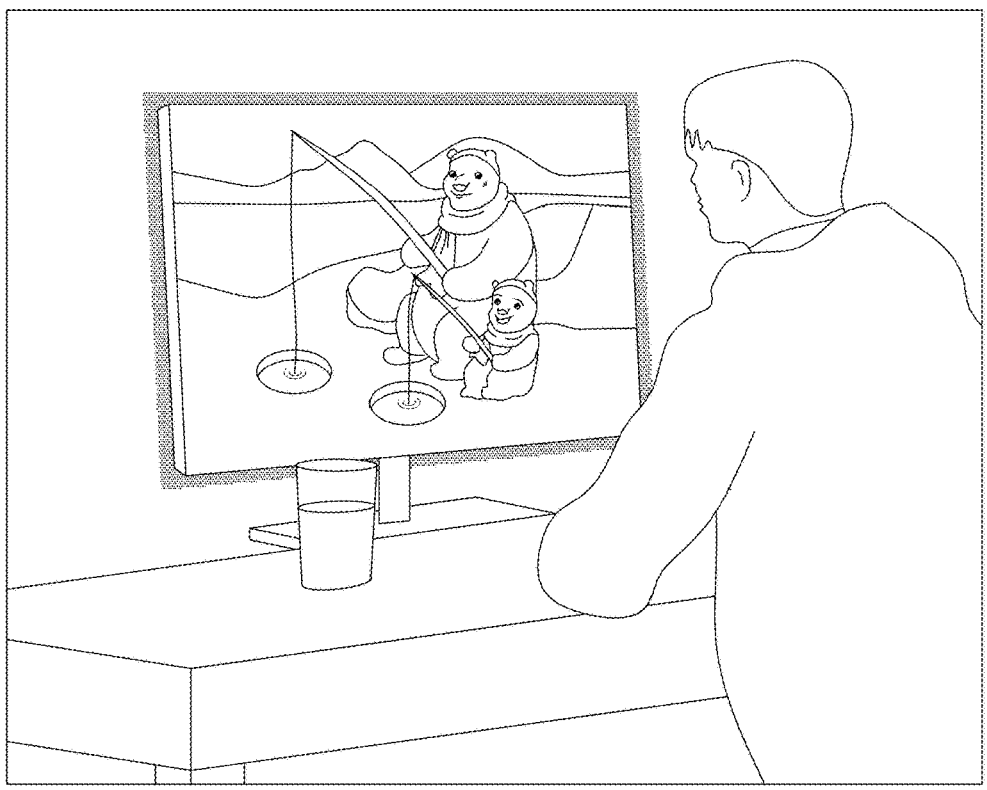
FIG. 6 is a diagram showing a display device according to an embodiment of the present disclosure.
Figure 6:
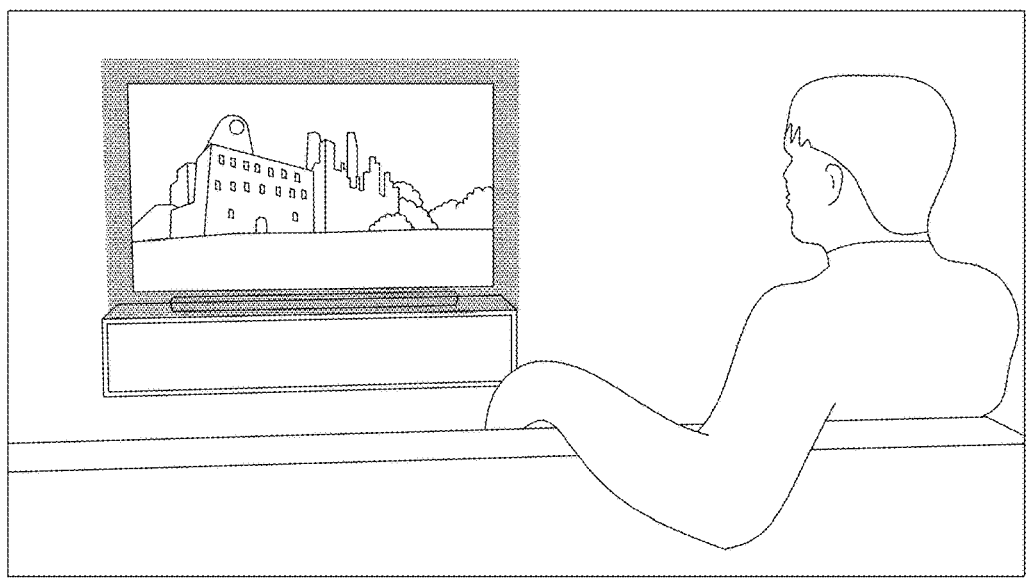

FIG. 6 is a diagram showing a display device according to an embodiment of the present disclosure.

Referring to FIG. 6, as a display device changes, there is a growing trend of releasing a display device that includes an entertainment element that engages five senses using various devices from an existing display device that only focuses on viewing. Representative examples of the display devices include a rollable display device and a bendable display device, which have new form factor elements. In particular, as an ambient display device using an LED light has been released recently, interest in an element that maximizes emotion using the LED light around the display device is increasing. However, until now, it has been challenging to reflect a mood of an actual image by merely rendering a color at an edge of a screen of the image in an extended manner or expressing a light based on specific mode settings. As a result, it has been difficult to well express the mood of the image that is viewed via image analysis. To address this issue, an embodiment of the present disclosure applies a quality-based emotion extraction algorithm and a surround white point optimization algorithm. This approach enhances the existing simplistic expression to operate more precisely, thereby maximizing a visual effect perceived from the image.

Hereinafter, an embodiment in which such display device maximizes the emotion using the LED light is to be proposed. In addition, following operations may be performed under control of a controller within the display device, but for convenience of description, the following operations will be described as being performed by the display device. In addition, a light used in the display device will be described to be the LED light as an example.

Figure 7:
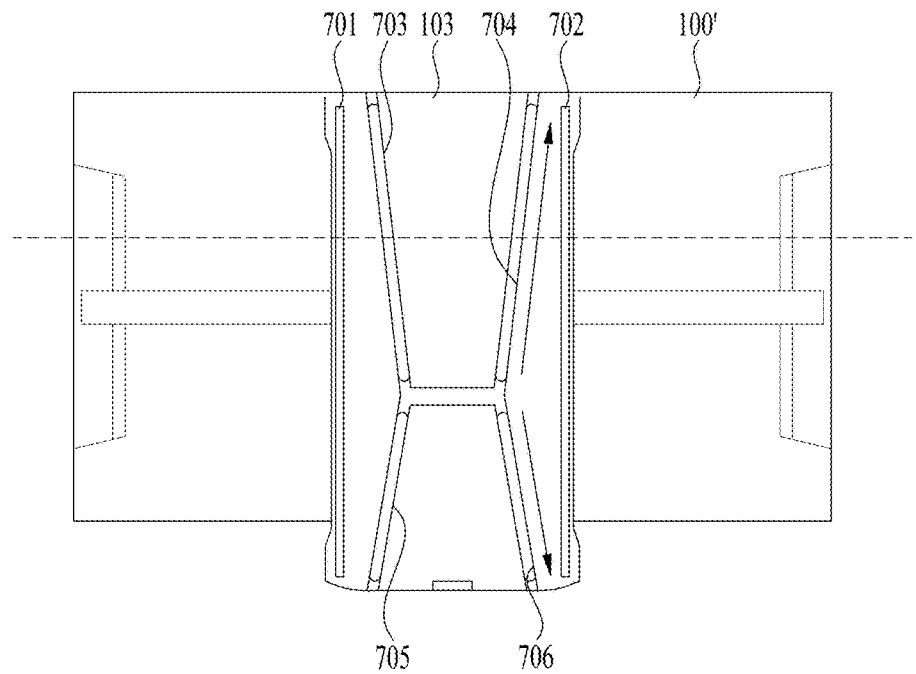
FIG. 7 is a diagram showing a light structure of a display device according to an embodiment of the present disclosure.
Figure 7:
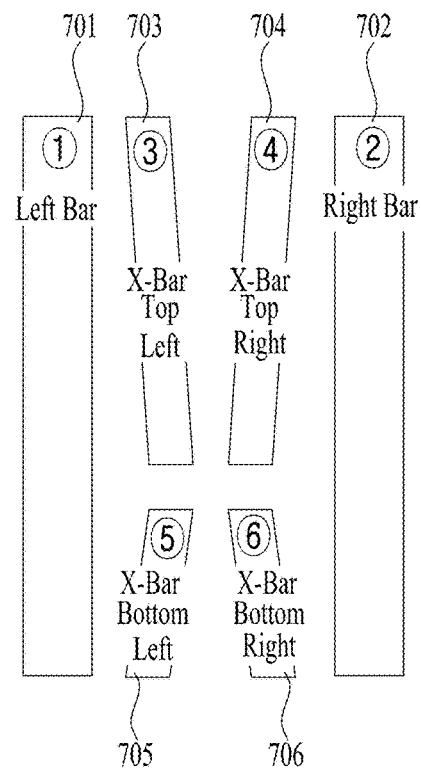

FIG. 7 is a diagram showing a light structure of a display device according to an embodiment of the present disclosure.

(a) in FIG. 7 shows a rear surface structure of a display device, and (b) in FIG. 7 shows a specific light structure.

Referring to (a) in FIG. 7, the display device may further include the back cover 103 to cover the main body 100' and the controller (not shown). In this regard, unlike the back cover 103 described above, it may be manufactured in a wider shape as shown in (a) in FIG. 7. In this case, the display device may include one or more lights 701, 702, 703, 704, 705, and 706. In this regard, the one or more lights 701, 702, 703, 704, 705, and 706 may include six LED bars. Here, the LED bar is a lamp with a long array of LED elements, and corresponds to an electronic lamp that emits light by arranging LEDs at a regular spacing via a stick or a tube and transmitting current. A length thereof may vary, and the LED bar may have various forms such as an aluminum LED bar, a lens-type LED bar, and a waterproof LED bar and may be flexible depending on a material.

Referring to (b) in FIG. 7, the one or more lights 701, 702, 703, 704, 705, and 706 may be attached to the back cover 103. In this regard, the one or more lights 701, 702, 703, 704, 705, and 706 may be positioned symmetrically to each other about a vertical axis (a y-axis). More specifically, a first LED bar 701 and a second LED bar 702 may have a bar structure with a height greater than a width, and a third LED bar 703, a fifth LED bar 705, a fourth LED bar 704, and a sixth LED bar 706 may be attached to the back cover 103 to form an X shape together. In particular, the third LED bar 703 and the fourth LED bar 704 are greater in height than the fifth LED bar 705 and the sixth LED bar 706.

However, this is only an example, and embodiments to be described below are not limited to the light structure in FIG. 7. In another example, the one or more lights may include four LED bars respectively attached to the first long side LS1, the second long side LS2, the first short side SS1, and the second short side SS2 of the main body 100'.

Figure 8:
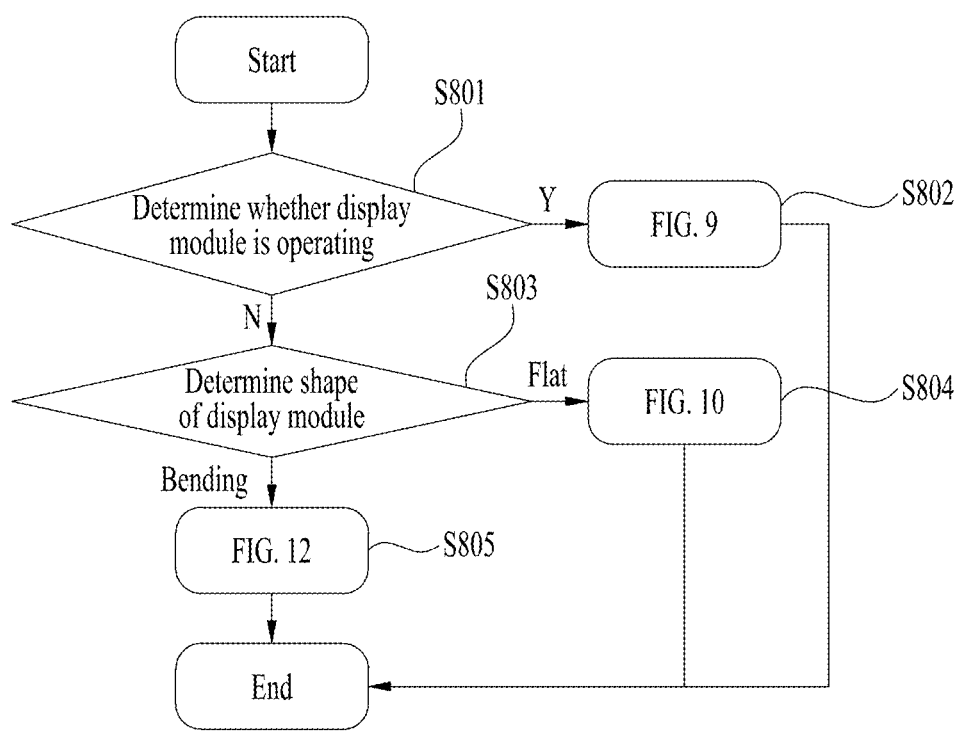
FIG. 8 is a flowchart showing a method for operating a display device according to an embodiment of the present disclosure.

FIG. 8 is a flowchart showing a method for operating a display device according to an embodiment of the present disclosure.

Referring to FIG. 8, in step S801, the display device may determine whether the display module is operating. Here, whether the display module is operating may include whether the display module is operating or not. The display device may perform step S802 when the display module is operating, and may perform step S803 when the display module is not operating.

In step S802, when the display module is operating, the display device may control a color rendered in the one or more lights to be changed based on a change in a curvature of the display module. This will be described in detail in FIG. 9.

In step S803, the display device may determine a shape of the display module. In this regard, the shapes of the display module may include a bending mode or a flat mode. The display device may perform step S804 when the display module is in the flat mode, and perform step S805 when the display module is in the bending mode.

However, an order of the determination in steps S801 and S803 may be changed. More specifically, the display device may perform step S803 first and then perform step S801. Accordingly, the display device may determine the current shape of the display module and determine whether the display module is operating.

In step S804, when the display module is in the flat mode, the display device may analyze a mode of the image output by the display module, and change the color rendered in the one or more lights based on a color temperature setting value of the analyzed mode. This will be described in detail in FIG. 10.

Figure 9:
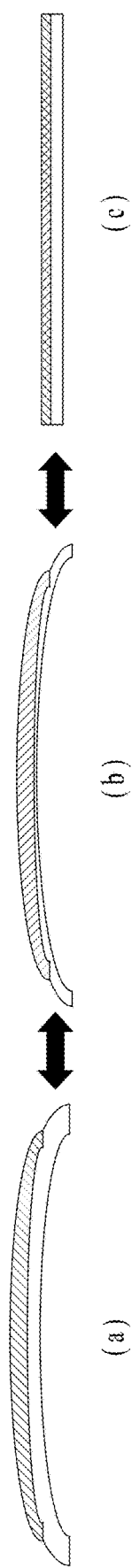
FIG. 9 is a diagram illustrating an embodiment of changing a light color based on a change in a curvature of a display module in a display device according to an embodiment of the present disclosure.

In step S805, when the display device is in the bending mode,

FIG. 9 is a diagram illustrating an embodiment of changing a light color based on a change in a curvature of a display module in a display device according to an embodiment of the present disclosure.

The display device according to an embodiment of the present disclosure is characterized in that the curvature of the display module may be changed. In this case, the display device may visually alert the user based on the change in the curvature of the display module. That is, the display device may determine whether the display module is operating, and when it is determined that the display module is operating, may change the color rendered in the one or more lights based on the change in the curvature of the display module.

Hereinafter, (a) to (c) in FIG. 9 assume that the display module is operating. In other words, it is assumed that the display module is operating from the bending mode to the flat mode or from the flat mode to the bending mode without being fixed in the bending mode in which the curvature of the display module is equal to or greater than a preset curvature and in the flat mode in which the curvature is equal to or smaller than the preset curvature.

More specifically, (a) in FIG. 9 shows an embodiment in which the display module is in the bending mode, (b) in FIG. 9 shows an embodiment in which the display module is operating from the bending mode to the flat mode or from the flat mode to the bending mode, and (c) in FIG. 9 shows an embodiment in which the display module is in the flat mode.

Referring to (a) in FIG. 9, the display device may control a first color to be rendered in the one or more lights when the display module is in the bending mode. For example, the first color may correspond to red.

Referring to (b) in FIG. 9, the display device may control a second color to be rendered in the one or more lights when the display module is operating from the bending mode to the flat mode or from the flat mode to the bending mode. In this regard, the display device may control the one or more lights to render the second color in a flashing manner. For example, the second color may correspond to yellow.

Referring to (c) in FIG. 9, when the display module is in the flat mode, the display device may control the one or more lights to render a third color. For example, the third color may correspond to green.

In other words, when the display module is operating as in the embodiment in FIG. 9, the display device may provide visual notification to the user via the one or more lights. In particular, because it may be dangerous to touch the display module while the display module is operating, the display device may contribute to user's safety by providing a visual warning to the user. In addition, because the display device provides the visual alarm in addition to an auditory alarm, a more efficient warning may be provided to hearing-impaired people.

Figure 10:
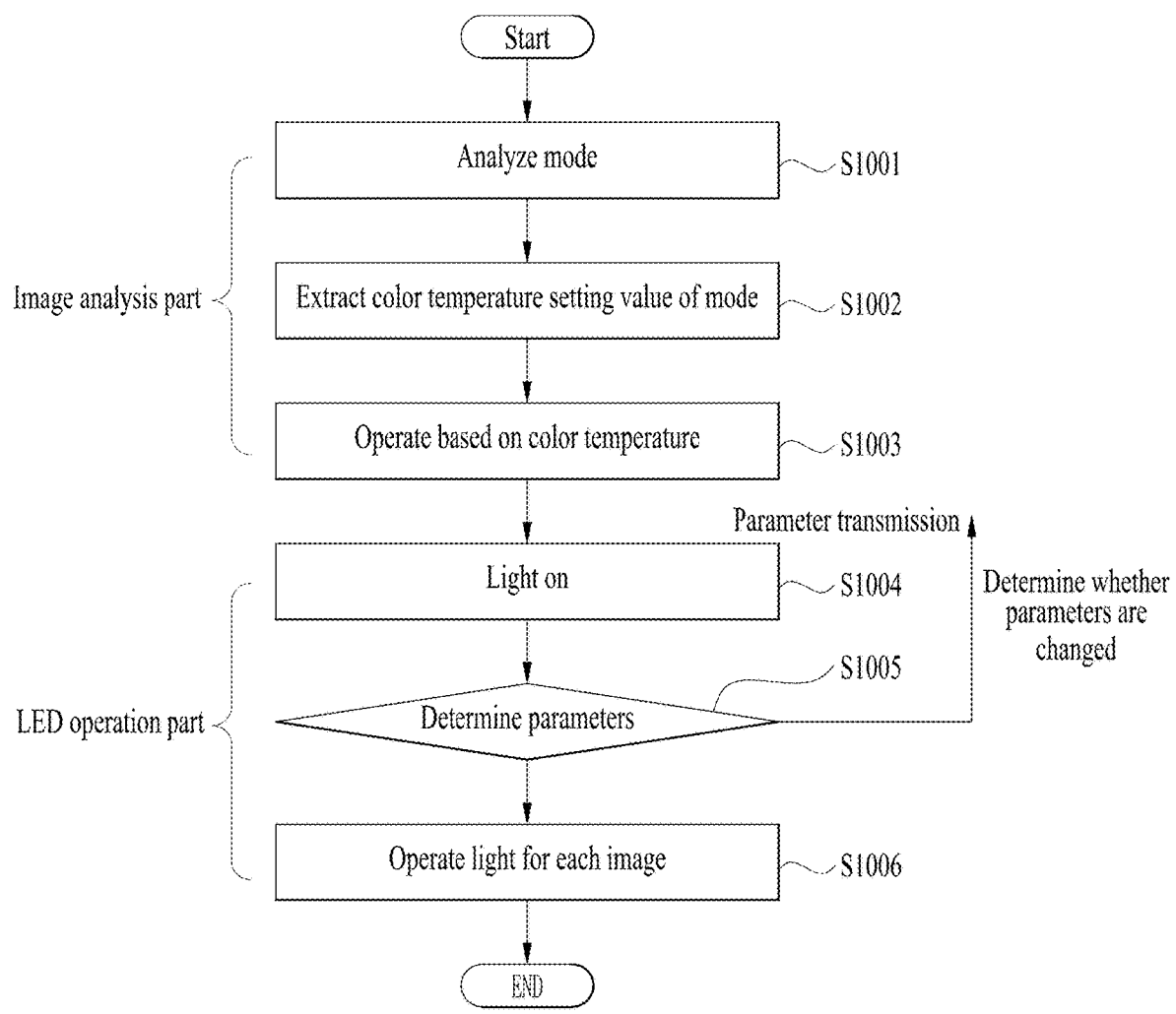
FIG. 10 is a diagram illustrating an embodiment of changing a light color based on a mode of an image output by a display module in a display device according to an embodiment of the present disclosure.

FIG. 10 is a diagram illustrating an embodiment of changing a light color based on a mode of an image output by a display module in a display device according to an embodiment of the present disclosure. Hereinafter, FIG. 10 will be described assuming that the display module is in the flat mode.

Referring to FIG. 10, in step S1001, the display device may analyze the mode of the image output by the display module. For example, the mode of the image output by the display module may include cinema, game, vivid, and the like.

In step S1002, the display device may extract a color temperature setting value of the analyzed mode. More specifically, each mode has a set standard for a brightness and a color temperature of the display panel. In an embodiment of the present disclosure, the color temperature may be set to 6500K in a first mode, to 8400K in a second mode, and to 9400K in a third mode. In addition, the display device may automatically set the mode when received content (a movie, a tv show, news, and the like) contains metadata that indicates the mode, and analyze the set mode to extract the color temperature setting value.

In step S1003, the display device may control the color rendered in the one or more lights to be changed based on the extracted color temperature. More specifically, the display device may control the one or more lights to output an optimal LED white value based on the extracted color temperature setting value. The one or more lights used at this time may include an LED light strip. The LED light strip may render 16 million colors, may express a color temperature in a range from 2000K to 6500K, and may output a maximum brightness of 1600 lumens.

In this regard, steps (S1001) to (S1003) may correspond to an image analysis part performed by the controller of the display device, and steps (S1004) to (S1006) below may correspond to an LED operation part performed by a light controller that controls the one or more lights of the display device. In this regard, the image analysis part performed by the controller of the display device may be realized in a hardware or software form.

In step S1004, the light controller that controls the one or more lights may render a color determined with parameters received from the controller of the display device via the one or more lights.

In step S1005, the light controller that controls the one or more lights may determine whether the parameters are changed at each preset period. When the parameters are changed, the changed parameters may be transmitted to change the color rendered by the one or more lights.

Accordingly, in step S1006, the display device may control the light to render a different color for each image.

According to the embodiment in FIG. 10, when a different optimal LED white value is output based on the mode in which the display device outputs the image, the user may enjoy the image with as little influence as possible from light, and may accurately perceive white output from the image as white.

In addition, as in the above-described embodiment, the display device may automatically set the mode when the received content contains the metadata that indicates the mode, and output the optimal LED white value based on the set mode to allow the user to perceive the color of the image more clearly.

Figure 11:
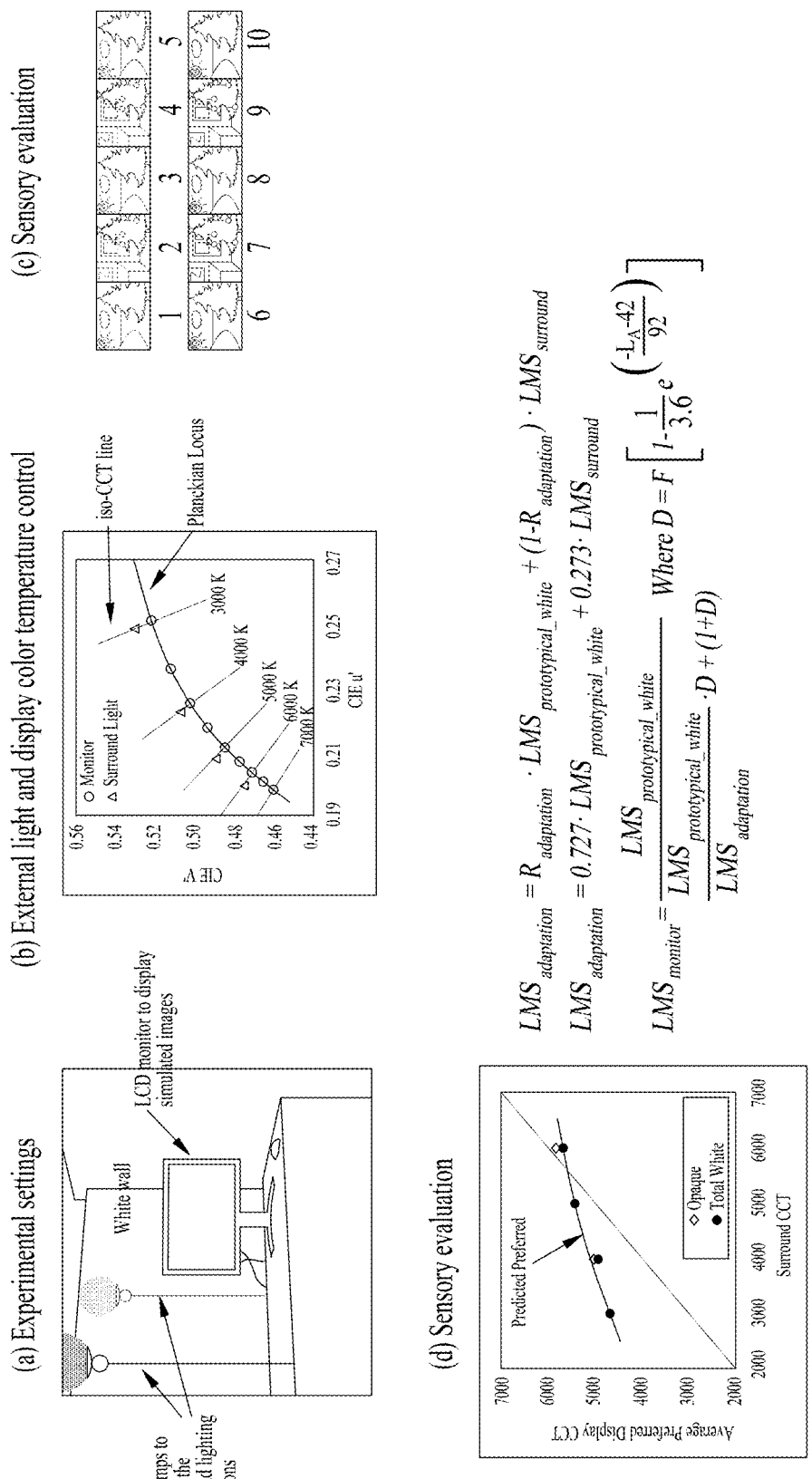
FIG. 11 is a diagram illustrating results of research on an optimal LED white value based on a color temperature setting value described in FIG. 10.

FIG. 11 is a diagram illustrating results of research on an optimal LED white value based on a color temperature setting value described in FIG. 10.

In other words, FIG. 11 shows the research results showing that when a color temperature of external light changes, an observer's preferred display color temperature changes.

In more detail, referring to (a) in FIG. 11, for the research on an embodiment of the present disclosure, external light was created with the LED capable of temperature and illuminance control, and the display device including the display module that outputs the image with the color temperature adjusted was able to be prepared.

Referring to (b) in FIG. 11, shown is a graph that divides the color temperature of external light into four stages and the color temperature of the image output by the display module into nine stages. In this regard, the color temperature of external light may be set from 3000K to 6000K in 1000K increments, and the color temperature of the image output by the display module may be set from 3000K to 7000K in 500K increments.

Referring to (c) in FIG. 11, an observer observing the image output by the display module may adapt to each of the four external light color temperatures, and select the most preferred image among images rendered in the nine colors rendered by the display module. In this regard, evaluation may proceed with 5 images rendered in white and 5 images rendered in color. Thereafter, the color temperatures of the images selected by the observer may be averaged.

Referring to (d) in FIG. 11, it may be seen that the observer's preferred color temperature output by the display module is proportional to the color temperature of external light. In this regard, a specific value for a preferred CCT of the display module based on an external light correlated color temperature (CCT) may be calculated by formularizing adaptation ratios of external light and a light source of the display device under a viewing condition in which both external light and the display device are present simultaneously.

In other words, as shown in FIG. 11, it may be seen that the observer's average preferred color temperature of the display varies depending on the color temperature of external light. Applying this to the embodiment in FIG. 10, the display device may output light at the color temperature preferred by the observer by adjusting the LED white value output to the one or more lights based on the extracted color temperature.

Figure 12:
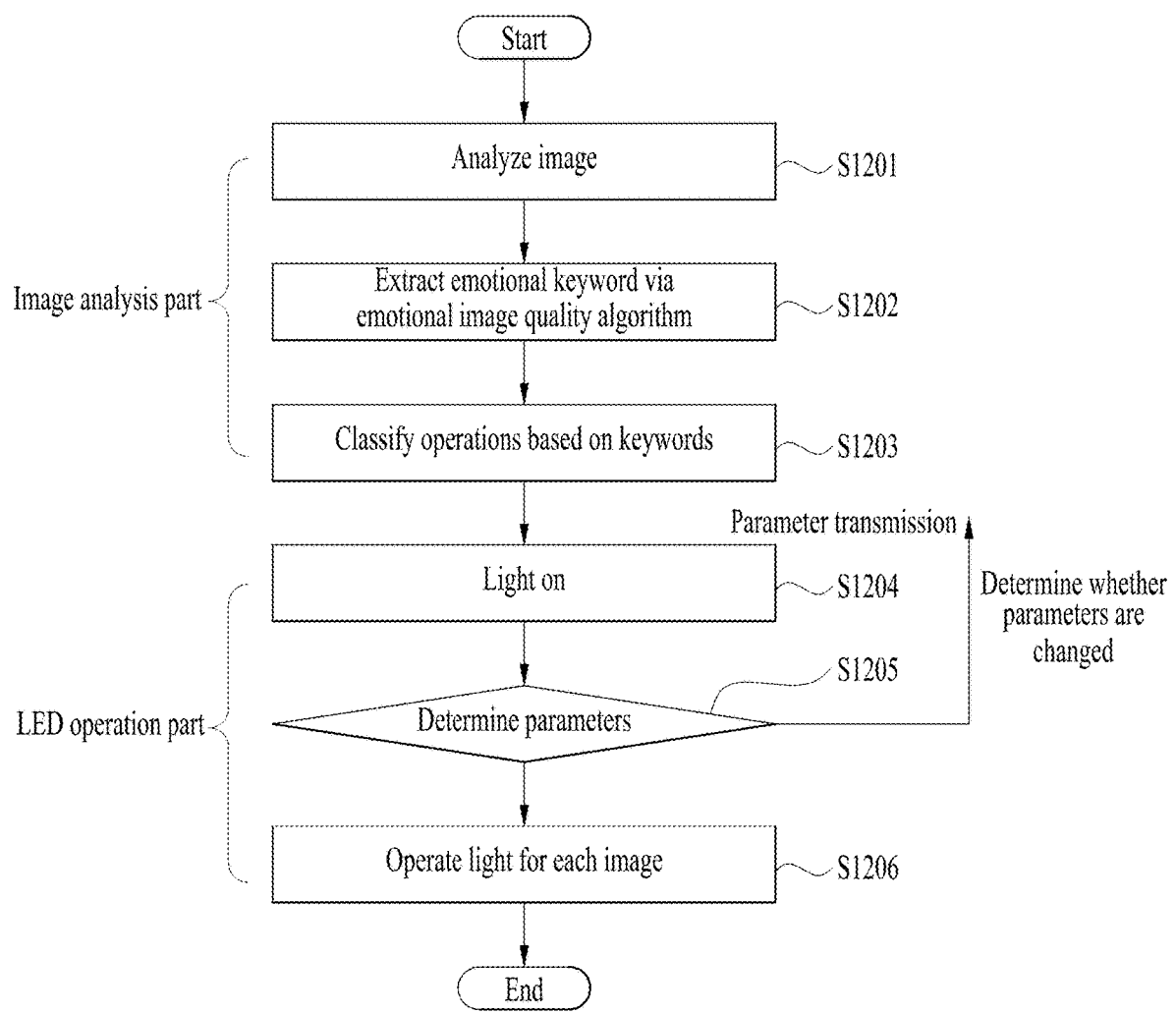
FIG. 12 is a diagram illustrating an embodiment of changing a light color based on an emotional keyword of an image output by a display module in a display device according to an embodiment of the present disclosure.

FIG. 12 is a diagram illustrating an embodiment of changing a light color based on an emotional keyword of an image output by a display module in a display device according to an embodiment of the present disclosure. Hereinafter, FIG. 12 will be described assuming that the display module is in the bending mode.

Referring to FIG. 12, in step S1201, the display device may analyze the image output by the display module. In this regard, the display device may analyze the image output by the display module using a system on chip (SOC).

In step S1202, the display device may extract the emotional keyword via an emotional image quality algorithm. For example, the emotional keywords may include soft, hard, cool, warm, and the like.

In step S1203, the display device may control the color rendered in the one or more lights to be changed based on the extracted emotional keyword. More specifically, the display device may control the one or more lights to output an optimal light color based on a color patch and a color spectrum based on the extracted emotional keyword. In this regard, the color patch and the color spectrum used for the output light color will be described in detail in drawings below.

In this regard, steps S1201 to S1203 may correspond to an image analysis part performed by the controller of the display device, and steps S1204 to S1206 below may correspond to an LED operation part performed by the light controller that controls the one or more lights of the display device. In this regard, the image analysis part performed by the controller of the display device may be realized in a hardware or software form.

In step S1204, the light controller that controls the one or more lights may render the color determined with the parameters received from the controller of the display device via the one or more lights.

In step S1205, the light controller that controls the one or more lights may determine whether the parameters are changed at each preset period. When the parameters are changed, the changed parameters may be transmitted to change the color rendered by the one or more lights.

Accordingly, in step S1206, the display device may control the light to render a different color for each image.

When the display device outputs the different LED light value based on the emotion of the image output according to the embodiment in FIG. 12, the user may enjoy the image more comfortably or with concentration. This will be described in more detail with drawings below.

Figure 13:
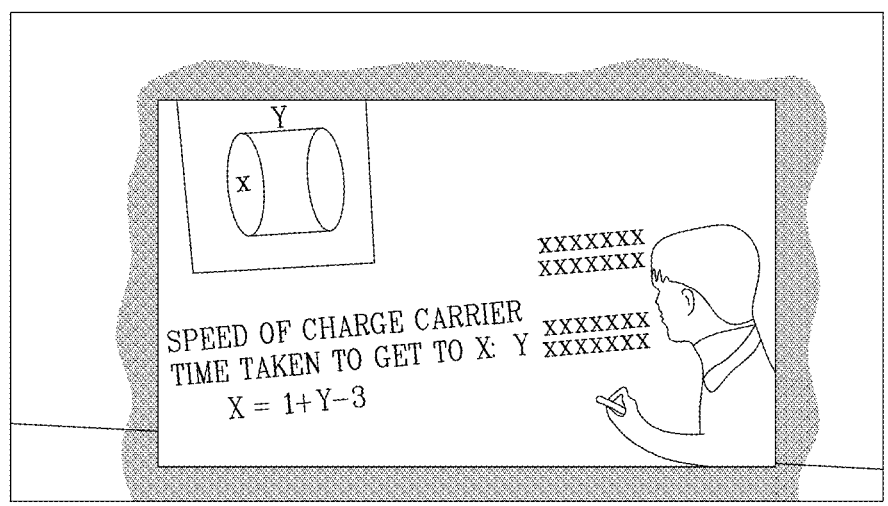
FIG. 13 is a diagram illustrating an embodiment of changing a light color based on content output by a display module in a display device according to an embodiment of the present disclosure.
Figure 13:
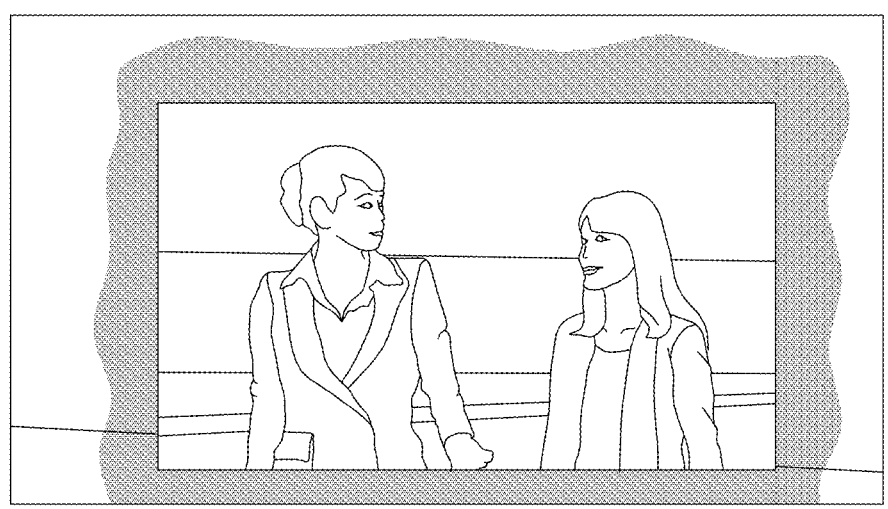

FIG. 13 is a diagram illustrating an embodiment of changing a light color based on content output by a display module in a display device according to an embodiment of the present disclosure.

(a) in FIG. 13 shows an embodiment in which the image output from the display module is educational content, and (b) in FIG. 13 shows an embodiment in which the image output from the display module is movie or tv show content.

Referring to (a) in FIG. 13, the display device may analyze the image output from the display module. When the analyzed image is the educational content, the display device may set the LED color temperature output from the light to be in a range from 7000K to 8000K. Because a high output color temperature of the LED helps improve concentration, when outputting the educational content, the display device may set the output color temperature of the one or more lights to be high to suit an intent of the educational content.

On the other hand, referring to (b) in FIG. 13, when the analyzed image is the movie or tv show content, the display device may set the LED color temperature output from the light to be in a range from 3000K to 4000K. Because a low output color temperature of the LED helps create a comfortable mood, when outputting content for image watching, the display device may set the output color temperature of the one or more lights to be low to suit an intent of the content for watching.

Figure 14:
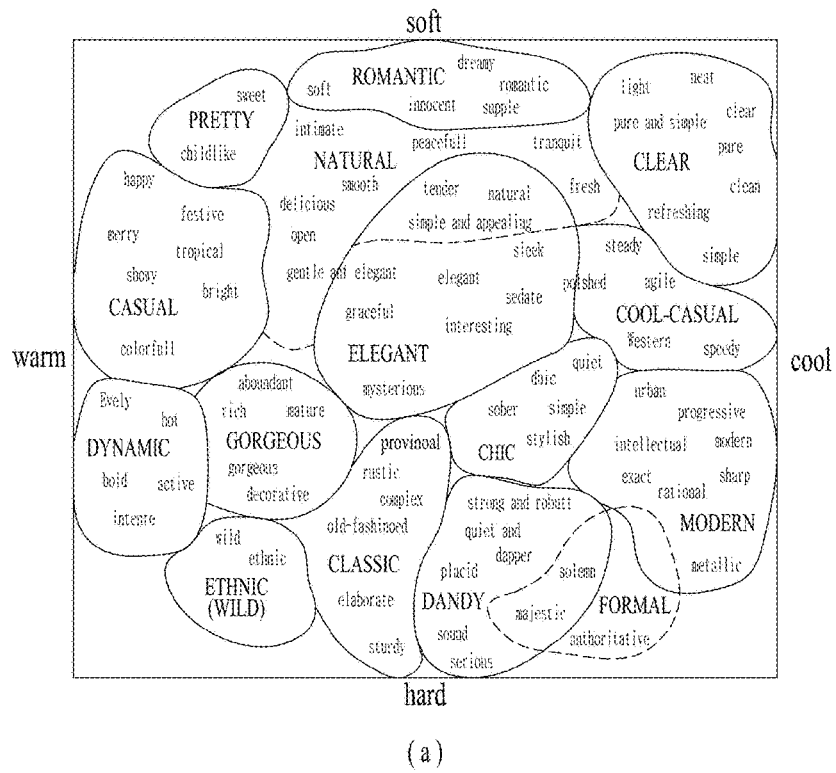
FIG. 14 is a diagram showing emotional keywords of an image output by a display module in a display device according to an embodiment of the present disclosure and colors respectively corresponding to the emotional keywords.
Figure 14:
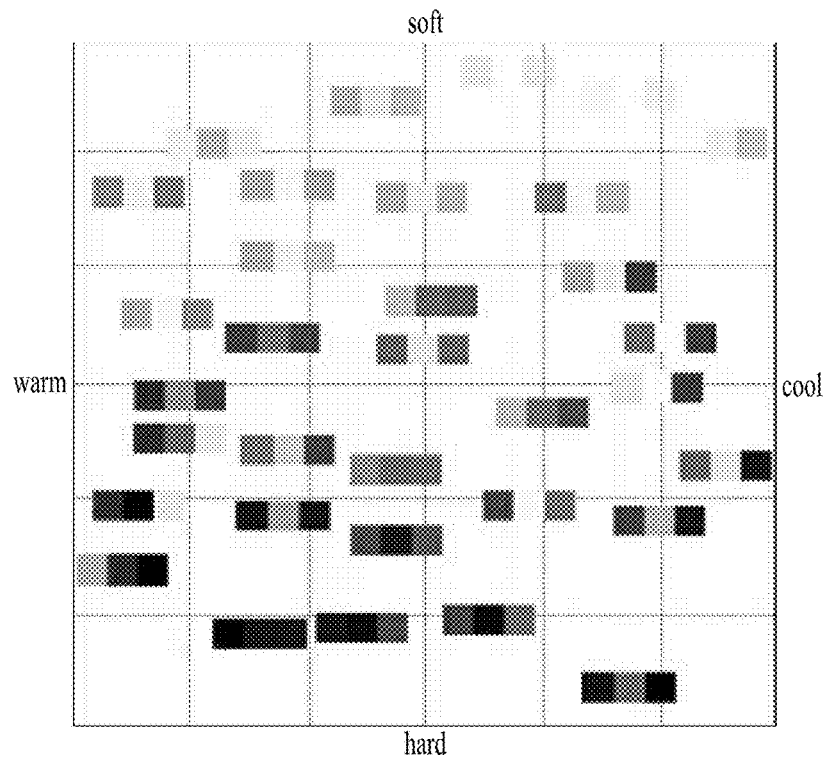

FIG. 14 is a diagram showing emotional keywords of an image output by a display module in a display device according to an embodiment of the present disclosure and colors respectively corresponding to the emotional keywords.

Referring to (a) in FIG. 14, the display device may analyze the image being output via the display module. An image analysis algorithm may divide the image into four areas (soft, hard, warm, and cool) and extract specific keywords within the divided areas.

Referring to (b) in FIG. 14, the display device may output a color matched based on the extracted keyword via the one or more lights. For example, when a formal keyword with hard and cool emotions is extracted from the analyzed image, the matched color may correspond to black, khaki, and gray. Accordingly, when the keyword extracted from the analyzed image is the 'formal', the display device may output black, khaki, and gray via the one or more lights.

FIG. 15 is a diagram showing a color patch referenced to output colors via one or more lights in a display device according to an embodiment of the present disclosure.

Referring to FIG. 15, the color patch corresponds to a color distribution map simplified with two properties of hue and tone. The display device may store a database for the color patch in a memory or receive the same from an external source. In an embodiment of the present disclosure, the display device may change the color rendered in the one or more lights based on the color patch.

Figure 16:
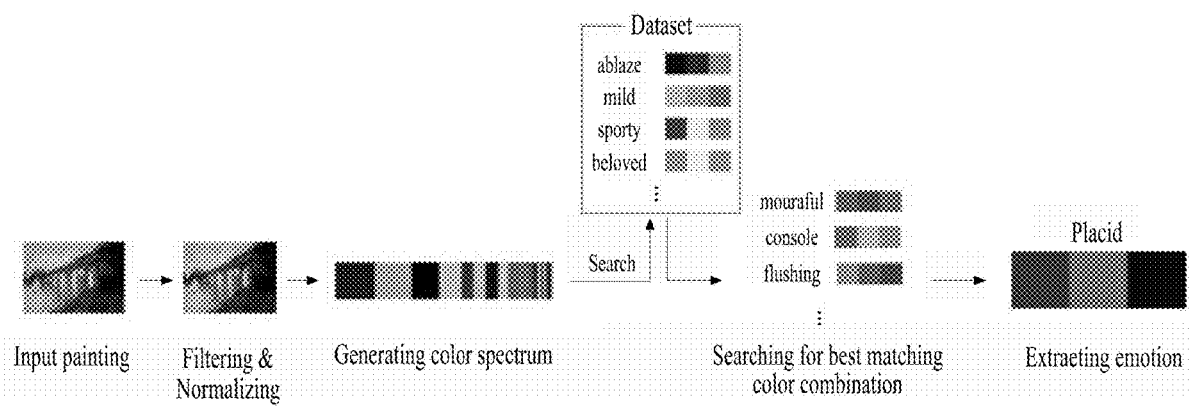
FIG. 16 is a diagram showing a color spectrum referenced to output colors via one or more lights in a display device according to an embodiment of the present disclosure.

FIG. 16 is a diagram showing a color spectrum referenced to output colors via one or more lights in a display device according to an embodiment of the present disclosure.

Referring to FIG. 16, when receiving the image output from the display module, the display device may create a color spectrum database via a filtering and normalizing process of the image. When the color spectrum database is created using numerous images, the display device may be shipped with the corresponding database stored in the memory or the corresponding database may be downloaded from an external source.

In an embodiment of the present disclosure, the display device may change the color rendered in the one or more lights based on the color spectrum.

More specifically, the display device may extract the emotional keyword via a three-color combinations database (FIG. 3 in FIG. 16, a data set of emotions with 3-color combinations) created based on color spectralized data via color clustering.

In other words, when the image is received, the display device may create a first color spectrum via the filtering and normalization process of the received image. Thereafter, the display device may search for a color spectrum similar to the first color spectrum within the three-color combinations database. The display device may extract a first emotional keyword, a second emotional keyword, and the like similar to the first color spectrum. The display device may change the color output from the light based on the extracted emotional keywords.

In particular, the display device may set a weight or a priority to the extracted emotional keyword. Accordingly, the display device may extract a representative emotional keyword. In this regard, the reason for extracting the representative emotional keyword is that when there are numerous keywords, colors for detailed operations corresponding to the respective keywords are not able to be output. Therefore, sub-keywords are extracted and then a color for the representative keyword is output.

In addition, the display device may output not only the colors directly corresponding to respective emotional keywords extracted from the image, but also colors included in the same cluster as the emotional keywords via the lights. In this regard, the display device may output a plurality of colors in order over time.

Figure 17:
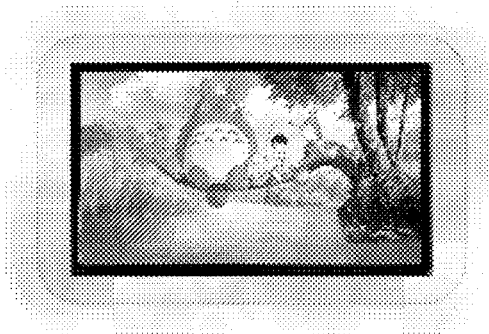
FIG. 17 is a diagram illustrating an embodiment of changing an output light color based on a color spectrum illustrated in FIG. 16.
Figure 17:
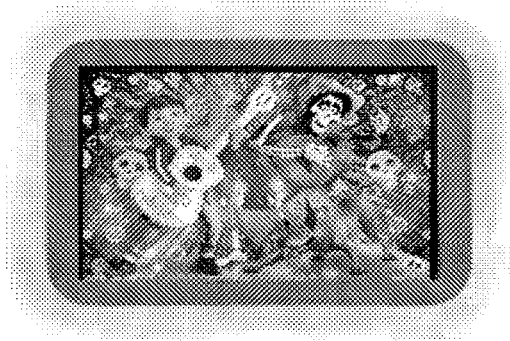

FIG. 17 is a diagram illustrating an embodiment of changing an output light color based on a color spectrum illustrated in FIG. 16.

Column 1 on a left side in a table in FIG. 17 represents content output via the display module in the display device, column 2 represents a color spectrum of content extracted via the method in FIG. 16, column 3 represents an emotional keyword extracted based on the extracted color spectrum, and column 4 represents a three-color combination determined based on the extracted emotional keyword.

Hereinafter, first content 1701 and second content 1702 will be described as examples.

Referring to FIG. 17, when receiving the first content 1701, the display device may extract an emotional keyword by analyzing a color spectrum of the first content 1701. The display device may extract a first color spectrum 1701*a* and a second color spectrum 1701*b* via the three-color combinations database based on the emotional keyword for the first content 1701.

Thereafter, the display device may output the first content 1701 via the display module, and simultaneously, output a color of the first color spectrum 1701*a* and a color of the second color spectrum 1701*b* via the one or more lights. In this regard, when the emotional keywords of the first content 1701 are extracted as clear and fresh, the display device may set a conversion speed of the color to be low within the first color spectrum 1701*a* and the second color spectrum 1701*b*, set brightness of the light high, and output a soft and cool color such as green and blue as the LED color.

On the other hand, when receiving the second content 1702, the display device may extract an emotional keyword by analyzing a color spectrum of the second content 1702. The display device may extract a third color spectrum 1702*a* and a fourth color spectrum 1702*b* via a three-color combinations database based on the emotional keyword for the second content 1702.

Thereafter, the display device may output the second content 1702 via the display module, and simultaneously, output a color of the third color spectrum 1702*a* and a color of the fourth color spectrum 1702*b* via the one or more lights. In this regard, when the emotional keywords of the second content 1702 are extracted as dynamic and gorgeous, the display device may set a conversion speed of the color to be high within the third color spectrum 1702*a* and the fourth color spectrum 1702*b*, set the brightness of the light low, and output a hard and warm color such as red and yellow as the LED color.

The present disclosure may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Mode for Invention

In the previous section titled "Best Mode," various embodiments of the present disclosure have been described, and it is understood that combining embodiments depicted in two or more drawings, as needed by those skilled in the art, also falls within the scope of the present disclosure.

INDUSTRIAL APPLICABILITY

The present disclosure is applicable to a bendable display device of various form factors, and thus industrially applicable.

What is claimed is:

1. A display device comprising:
a main body including a display module where an image is output;
one or more ambient lights located on a rear surface of the main body; and
a controller,
wherein the controller is configured to:
determine whether the display module is operating; and
determine a shape of the display module,
wherein, when determining that the display module is operating, the controller is configured to change a color rendered in the one or more ambient lights based on a change in a curvature of the display module, and
wherein the controller is further configured to:
control the one or more ambient lights to render a first color when the display module is in a bending mode;
control the one or more ambient lights to render a second color when the display module is in a flat mode; and
control the one or more ambient lights to render a third color when the display module is operating from the bending mode to the flat mode or when the display module is operating from the flat mode to the bending mode.

2. The display device of claim 1, wherein the controller is configured to:
analyze a mode of the image output by the display module when the shape of the display module is the flat mode;
extract a color temperature setting value of the analyzed mode; and
further change the color rendered in the one or more ambient lights based on the extracted color temperature.

3. The display device of claim 2, wherein the color rendered in the one or more ambient lights is an optimal LED white value based on the extracted color temperature.

4. The display device of claim 1, wherein the controller is configured to:
extract an emotional keyword from the image output by the display module when the shape of the display module is a bending mode; and
further change the color rendered in the one or more ambient lights based on the extracted emotional keyword.

5. The display device of claim 4, further comprising a database for a color patch,
wherein the controller is configured to change the color rendered in the one or more ambient lights based on the color patch.

6. The display device of claim 4, further comprising a database for a color spectrum,
wherein the controller is configured to change the color rendered in the one or more ambient lights based on the color spectrum.

7. The display device of claim 1, wherein the one or more ambient lights include six LED bars,
wherein the six LED bars are located symmetrically to each other about a vertical axis.

8. The display device of claim 1, further comprising a back cover for covering the main body and the controller,
wherein the one or more ambient lights are located on the back cover.

9. The display device of claim 1, further comprising:
a bending module located at a center of the rear surface of the main body;
a pair of links, wherein each link has one end coupled to the bending module and extends in a left and right direction; and
link brackets located at left and right ends of the main body, respectively, wherein the other end of each link is connected to each link bracket,
wherein the bending module includes:
a guide shaft extending from the rear surface of the main body; and a moving block inserted into the guide shaft and movable in a forward and rearward direction, wherein when the moving block moves in the forward and rearward direction along the guide shaft, an angle between the pair of links changes and a curvature of the display module changes.

10. A method for controlling a display device, the method comprising:

outputting an image via a display module of the display device;

determining whether the display module is operating;

determining a shape of the display module; and changing a color rendered in one or more ambient lights attached to a rear surface of a main body of the display device based on at least one of whether the display module is operating or the shape of the display module, wherein the method further comprises:

when the display module is operating, changing a color rendered in the one or more ambient lights based on a change in a curvature of the display module, and wherein the method further comprises:

controlling the one or more ambient lights to render a first color when the display module is in a bending mode;

controlling the one or more ambient lights to render a second color when the display module is in a flat mode; and controlling the one or more ambient lights to render a third color when the display module is operating from the bending mode to the flat mode or when the display module is operating from the flat mode to the bending mode.

* * * * *